US010689540B2

(12) United States Patent
Maaijen et al.

(10) Patent No.: US 10,689,540 B2
(45) Date of Patent: Jun. 23, 2020

(54) OXIDATIVELY CURABLE COATING COMPOSITION

(71) Applicant: Catexel Limited, London (GB)

(72) Inventors: Karin Maaijen, Leiden (NL); Ronald Hage, Leiden (NL)

(73) Assignee: Catexel Limited, London (GB)

( * ) Notice: Subject to any disclaimer, the term of this patent is extended or adjusted under 35 U.S.C. 154(b) by 179 days.

(21) Appl. No.: 16/009,786

(22) Filed: Jun. 15, 2018

(65) Prior Publication Data

US 2018/0298230 A1  Oct. 18, 2018

Related U.S. Application Data

(63) Continuation of application No. PCT/GB2016/053978, filed on Dec. 19, 2016.

(30) Foreign Application Priority Data

Dec. 18, 2015 (EP) .................................... 15201090

(51) Int. Cl.
| | | |
|---|---|---|
| *C09D 167/08* | (2006.01) | |
| *C08G 63/48* | (2006.01) | |
| *C08K 5/3432* | (2006.01) | |
| *C08J 3/24* | (2006.01) | |

(52) U.S. Cl.
CPC ........... *C09D 167/08* (2013.01); *C08G 63/48* (2013.01); *C08J 3/24* (2013.01); *C08K 5/3432* (2013.01); *C08J 2367/08* (2013.01)

(58) Field of Classification Search
CPC ... C09D 167/08; C08K 5/3432; C08K 5/0091
See application file for complete search history.

(56) References Cited

U.S. PATENT DOCUMENTS

| | | | |
|---|---|---|---|
| 5,850,086 A | 12/1998 | Que, Jr. et al. | |
| 6,153,576 A | 11/2000 | Blum et al. | |
| 2001/0008932 A1 | 7/2001 | Bakkeren et al. | |
| 2005/0245639 A1 | 11/2005 | Oostveen et al. | |
| 2014/0221520 A1 * | 8/2014 | Weijnen ............... | C09D 167/07 522/64 |

FOREIGN PATENT DOCUMENTS

| | | |
|---|---|---|
| EP | 0909809 A2 | 4/1999 |
| EP | 1382648 A1 | 1/2004 |
| JP | 2015183056 A * | 10/2015 |
| WO | 2003/029371 A1 | 4/2003 |
| WO | 2003/093384 A1 | 11/2003 |
| WO | 2008/003652 A1 | 1/2008 |
| WO | 2011/098583 A1 | 8/2011 |
| WO | 2011/098584 A1 | 8/2011 |
| WO | 2011/098587 A1 | 8/2011 |
| WO | 2012/079624 A1 | 6/2012 |
| WO | 2012/092034 A2 | 7/2012 |
| WO | 2012/093250 A1 | 7/2012 |
| WO | 2013/045475 A1 | 4/2013 |
| WO | 2013/092441 A1 | 6/2013 |
| WO | 2013/092442 A1 | 6/2013 |
| WO | 2014/095670 A1 | 6/2014 |
| WO | 2014/122432 A1 | 8/2014 |
| WO | 2014/122434 A1 | 8/2014 |
| WO | 2015/082553 A1 | 6/2015 |

OTHER PUBLICATIONS

Translation of JP Application No. 2014/059563, which is the same as JP Publication 2015/183056 (2015, 22 pages).*
Anderegg et al., Pyridinderivate als Komplexbildner VIII Die Herstellung je eines neuen vier- und sechszahnigen Liganden. Helvetica Chimica Acta. 1967;50(8):2330-2332.
Bieleman, Driers. Chimia. 2002;56(5):184-190.
Bieleman, Progress in the Development of Cobalt-free Drier Systems. Macromol Symp. 2002;187:811-821.
Borzel et al., Iron coordination chemistry with tetra-, penta- and hexadentate bispidine-type ligands. Inorganica Chimica Acta. 2002;337;407-419.
Canty et al., Coordination Chemistry of Methylmercury(II). Synthesis, H NMR and Crystallographic Studies of Cationic Complexes of MeHgII with Ambidentate and Polydentate Ligands Containing Pyridyl and N-Substituted Imidazolyl Donors and Involving Unusual Coordination Geometries. Inorg Chem. 1981;20:2414-22.
Canty et al., Drier Catalyst Activity in Organic Coatings. Industrial and Engineering Chemistry. Jan. 1960;52(1):67-70.
Clavreul et al., Synthesis and curing of poly(styrylpyridine)s. Structural study on models and on teh resins, 1. Makromol. Chem. 1987;188:47-65.
Comba et al., Synthesis and characterisation of manganese(II) compounds with tetradentate ligands based on the bispidine backbone. J Chem Soc Dalton Trans. 1998, pp. 3997-4001.
Gafford et al., Oxidative Synthesis of Bis(mu-hydroxo) Chromium(III) Dlmers with Aromatic Amine Ligands. Structure, Physical Properties, and BAe Hydrolysis Kinetics of the Bis(mu-hydroxo)bis{(tris(2-pyridylmethyl)amine) chromium(III)} Ion. Inorg Chem. 1989:28:60-66.
Hage et al., Applications of transition-metal catalysts to textile and wood-pulp bleaching. Angew Chem Int Ed Engl. 2006;45(2):206-22.
Hage et al., Manganese and Iron Bleaching and Oxidation Catalysts. Advances in Inorganic Chemistry, Homogeneous Catalysis. Academic Press, Burlington. vol. 65, pp. 85-116, (2013).
Klopstra et al., Non-Heme Iron Complexes for Stereoselective Oxidation: Tuning of the Selectivity in Dihydroxylation Using Different Solvents. Eur J Inorg Chem. 2004, pp. 846-856.

(Continued)

*Primary Examiner* — Brieann R Johnston
(74) *Attorney, Agent, or Firm* — FisherBroyles LLP; Louis F. Wagner

(57) ABSTRACT

The present invention relates to an oxidatively curable coating formulation comprising an oxidatively curable alkyd-based resin and a chelant capable of chelating at least one transition metal ion through either three or four nitrogen atoms, which chelants may each optionally be complexed with one or two transition metal ions, typically iron or manganese ions. The formulations may be paints or other oxidatively curable coating compositions. The invention also provides methods for making such formulations and compositions resultant from the curing of such formulations.

13 Claims, No Drawings

(56) References Cited

OTHER PUBLICATIONS

Kodera et al., A Cu(II)-mediated C—H oxygenation of sterically hindered tripyridine ligands to form triangular Cu(II)3 complexes. Inorg Chem. Jan. 24, 2000;39(2):226-34.

Kodera et al., A diiron center stabilized by a bis-TPA ligand as a model of soluble methane monooxygenase: predominant alkene epoxidation with H2O2. Angew Chem Int Ed Engl. Nov. 4, 2005;44(43):7104-6.

Kodera et al., Crystal Structure and Reversible O2-Binding of a Room Temperature STable mu-eta2:eta2-Peroxodicopper(II) Complex of a Sterically Hindered Hexapyridine Dinucleating Ligand. J Am Chem Soc. 1999;121:11006-7.

Kodera et al., Synthesis, structure, and greatly improved reversible O2 binding in a structurally modulated micro-eta 2:eta 2-peroxodicopper(II) complex with room-temperature stability. Angew Chem Int Ed Engl. Jan. 3, 2004;43(3):334-7.

Lee et al., Reversible O2 Binding to a Dinuclear Copper(I) Complex with Linked Tris(2-pyridylmethyl)amine Units: Kinetic-Thermodynamic Comparisons with Mononuclear Analogues. J Am Chem Soc. 1995;117:12498-513.

Oyman et al,. Oxidative drying of alkyd paints catalysed by a dinuclear manganese complex (MnMeTACN). Surface Coatings International Part B: Coatings Transactions. Dec. 2005;88:269-275.

Roelfes et al., Efficient DNA Cleavage with an Iron Complex without Added Reductant. J Am Chem Soc. 2000;122(46):11517-8.

Topalovic et al., Model System for Mechanistic Study of Catalytic Bleaching of Cotton. 5th World Textile Conference, AUTEX 2005. 8 pages, Jun. 27-29, 2005.

Towle et al., Synthesis and characterization of the binuclear mixed valence complex di-μ-oxobis[tris(2-methyl-pyridyl)amine] dimanganese(III, IV) dithionate heptahydrate, [(tpa)MnO]2(S2O6)3/2•7H2O. Inorganica Chimica Acta. Jan. 15, 1988;141:167-8.

Van Gorkum et al., The oxidative drying of alkyd paint catalysed by metal complexes. Coordination Chemistry Reviews. 2005;249:1709-28.

Van Gorkum et al., Fast autoxidation of ethyl linoleate catalyzed by [Mn(acac)3] and bipyridine: a possible drying catalyst for alkyd paints. Inorg Chem. Apr. 19, 2004;43(8):2456-8.

Wei et al., Kinetic Preference without Thermodynamic Stabilization in the Intra-vs Intermolecular Formation of Copper-Dioxygen Complexes. Inorg Chem. 1994;33:4625-6.

Weissenborn et al., Emulsification, drying and film formation of alkyd emulsions. Progress in Organic Coatings. 2000;40:253-266.

De Boer et al., The Quest for Cobalt-Free Alkyd Paint Driers. Eur J Inorg Chem. 2013;2013:3581-3591.

International Search Report for Application No. PCT/GB2016/053978, dated Feb. 21, 2017. 4 pages.

\* cited by examiner

US 10,689,540 B2

OXIDATIVELY CURABLE COATING COMPOSITION

CROSS-REFERENCE TO RELATED APPLICATIONS

This application is a continuation application, filed under 35 U.S.C. § 111(a), of International Application No. PCT/GB2016/053978, filed on Dec. 19, 2016 in English and designating the United States, published as WO 2017/103620 A1, which claims priority to European Patent Application No. 15201090.6, filed on Dec. 18, 2015. The entire contents of each of the above-referenced applications are incorporated herein by reference.

FIELD OF THE INVENTION

The present invention relates to an oxidatively curable coating formulation comprising an oxidatively curable alkyd-based resin and a chelant capable of chelating at least one transition metal ion through either three or four nitrogen atoms, which chelants may each optionally be complexed with one or two transition metal ions, typically iron or manganese ions. The formulations may be paints or other oxidatively curable coating compositions. The invention also provides methods for making such formulations and compositions resultant from the curing of such formulations.

BACKGROUND OF THE INVENTION

Alkyd resins are a well-understood and dominant binder in many oxidatively curable paints and other solvent-based coatings. Alkyd emulsion paints, in which the continuous phase is aqueous, are also widely available commercially. Alkyd resins are produced by the reaction of polyols with carboxylic acids or anhydrides. To make them susceptible to what is commonly referred to as a drying process, some alkyd resins are reacted with unsaturated triglycerides or other source of unsaturation. Plant and vegetable oils, such as linseed oil, are frequently used as the source of triglycerides. In these drying processes, unsaturated groups, in particular carbon-carbon double bonds, can react with oxygen from the air, causing the oils to crosslink, form a three-dimensional network, and harden. This oxidative curing process, although not drying, gives the appearance of drying and is often and herein referred to as such. The length of time required for drying depends on a variety of factors, including the constituents of the alkyd resin formulation and the amount and nature of the liquid continuous phase (e.g. solvent) in which the alkyd resin is formulated.

Film formation results from the autoxidation and polymerisation chemistries that occur during the drying of alkyd-based resins. It will proceed in the absence of catalysis. However, it is customary to include in formulations of curable resins small, i.e. catalytic, quantities of optionally organic metal salts, often referred to as metal driers, which catalyse the polymerisation of unsaturated material so as to form the three-dimensional network.

Driers used for solvent-based coatings are often alkyl carboxylates, typically $C_{6-18}$ carboxylates, of metals such as cobalt, manganese, lead, zirconium, zinc, vanadium, strontium, calcium and iron. These metal carboxylates are often referred to as metal soaps. Redox-active metals, such as manganese, iron, cobalt, vanadium and copper, enhance radical formation, and thus the oxidative curing process, whilst so-called secondary driers (sometimes referred to as auxiliary driers), such as complexes based on strontium, zirconium and calcium, enhance the action of the redox-active metals. Often these soaps are based on medium-chain alkyl carboxylates such as 2-ethyl-hexanoate. The lipophilic units in such soaps enhance the solubility of the drier in solvent-based paints and other oxidatively curable coating compositions.

As well as metal soaps, a variety of metal driers that are redox metal complexes containing organic ligands can be used as driers, for example manganese complexes comprising 2,2'-bipyridine (bpy).

The formation of a skin or lumpy matter is a problem observed in many oil-based (i.e. organic solvent-based) formulations, and in particular in organic solvent-based alkyd resins, as a consequence of oxidation during storage or transportation. Oxidative polymerisation reactions can thus lead to the skin formation before application, as well as the intended drying after application. As alluded to above, these polymerisation reactions can be triggered by radicals generated by the action of metal-based driers, for example cobalt-, manganese- or iron-containing driers. In other words, the cause of the skin formation is often associated with the presence of metal driers.

Whilst cobalt driers have been employed for many years as paint driers, there is a desire to develop alternatives, not least since cobalt soaps may need to be registered as carcinogenic materials. Iron- and manganese-based paint driers in particular have received considerable attention in recent years in the academic and patent literature as alternatives to cobalt-based driers. For some recent academic publications addressing this topic in detail see publications by J H Bieleman (in *Additives in Plastics and Paints, Chimia, infra*)); J H Bieleman (*Marcomol. Symp.*, 187, 811 (2002)); and R E van Gorkum and E Bouwman (*Coord. Chem. Rev.*, 249, 1709 (2005)).

WO 03/093384 A1 (Ato B.V.) describes the use of reducing biomolecules in combination with transition metal salts or complexes based on pyrazoles, aliphatic and aromatic amines, bpy, 1,10-phenanthroline (phen) and 1,4,7-trimethyl-1,4,7-triazacyclononane ($Me_3TACN$).

WO 03/029371 A1 (Akzo Nobel N.V.) describes the use of complexes comprising Schiff base compounds to enhance the drying of coatings, in which complexes at least one solubilising group is covalently bound to the organic ligand.

EP 1382648 A1 (Universiteit Leiden) describes the use of manganese complexes with acetylacetonate and bidentate nitrogen donor ligands in paint drying.

WO 2008/003652 A1 (Unilever PLC et al.) describes the use of specific classes of tetradentate, pentadentate or hexadentate nitrogen ligands bound to manganese and iron ions as siccatives for curing alkyd-based resins.

WO 2012/079624 A1 (PPG Europe BV) describes alkyd-based coating compositions comprising iron- and manganese-containing complexes in combination with potassium salts of an organic acid. WO 2013/045475 A1 (PPG Europe BV) describes compositions comprising modified alkyd binders and iron- and manganese-containing complexes. WO 2015/082553 A1 (PPG Europe BV) describes dryer compositions for two oxidisable alkyd-based coating compositions, which compositions comprise at least one iron complex with at least one manganese, cerium, vanadium or copper salt of a carboxylic acid and at least one ligand.

Oyman et al. describe the oxidative drying of alkyd paints by $[Mn_2(\mu-O)_3(Me_3tacn)_2](PF_6)_2$ (Z O Oyman et al., *Surface Coating International Part B—Coatings Transaction*, 88, 269 (2005)). WO 2011/098583 A1, WO 2011/098584 A1 and WO 2011/098587 A1 (each DSM IP Assets B.V.) describe the use of a variety of dinuclear manganese complexes with Me₃TACN as ligand for paint drying. WO2013/092441 and WO2013/092442 (each Akzo Nobel Coatings International BV) describe the use in coating compositions of mixtures of Mn salts with either a molar excess of Me₃TACN as ligand with respect to the Mn salt, or a molar excess of Mn salts with respect to Me₃TACN. WO2014/095670 (Akzo Nobel Coatings International BV) claims mixtures of dinuclear Mn complexes with Me₃TACN as ligand with additional Me₃TACN ligand in the paint/coating formulations.

WO 2014/122432 A1 (Chemsenti Limited) describes the use of bridged bis-triazacyclononane-based chelants for curing alkyd-based curable resins.

WO 2012/092034 A2 (Dura Chemicals, Inc.) describes the use of a transition metal and a porphyrin based ligand as a siccative for resin compositions.

WO 2014/122434 A1 (Catexel Limited) describes the use of diazacycloalkane-based chelants for curing alkyd-based curable resins.

The use of mixtures of metal salts and ligands to enhance drying of paint formulations is known. For example, W H Canty, G K Wheeler and R R Myers (*Ind. Eng. Chem.*, 52, 67 (1960)) describe the drying capability of a mixture of phen and Mn soap, which is similar to that of prepared Mn-phen complexes. Mixtures of bpy and manganese soaps show a better drying performance than manganese soaps without bpy (see P K Weissenborn and A Motiejauskaite, *Prog. Org. Coat.*, 40, 253 (2000)). Also, R van Gorkum et al. (*Inorg. Chem.*, 43, 2456 (2004)) describe that the addition of bpy to Mn(acetylacetonate)₃ gives an acceleration in the drying performance, and attribute this to the formation of manganese-bipyridine complexes. The use of manganese complexes with acetylacetonate and bidentate nitrogen donor ligands in paint drying has also been described in EP 1382648 A1 (Universiteit Leiden).

In WO 2012/093250 A1 (OMG Additives Limited) it is described that, by contacting an aqueous solution of transition metal ions and polydentate ligands with alkyd-based formulations, the resultant formulation shows reduced skinning tendency as compared with the introduction of metal ions and polydentate ligands in non-aqueous media.

It may be inferred from the recent literature, including patent literature, published in the field of oxidatively curable coating formulations, for example from WO 2008/003652 A1, WO 2011/098583 A1, WO 2011/098584 A1, WO 2011/098587 A1 and WO 2012/092034 A2, that advantageous curing rates of oxidatively curable resins, for example alkyd-based resins, result from the use of metal driers comprising ligands that give rise to relatively stable transition metal-ligand complexes. In general, when using polydentate ligands, i.e. ligands that bind a metal ion through more than one donor site, improved stability of the resultant metal complexes in different redox states can be observed as compared to the corresponding complexes where monodentate ligands are used.

Nevertheless, there remains a need in the art of oxidatively curable formulations for the provision of further curable formulations, which need not comprise cobalt-based driers, but which nevertheless exhibit acceptable rates of curing. Also, there remains a need in the field of oxidatively curable alkyd-based formulations to be able to provide a formulation which, on the one hand, ameliorates the problem of skinning upon storage of such formulations that comprise metal-based driers, and on the other hand requires less modification by the manufacturers of oxidatively curable coating compositions suitable for application than existing oxidatively curable alkyd-based formulations that are essentially absent metal-based driers. The present invention is intended to address these needs.

SUMMARY OF THE INVENTION

We have found that transition metal complexes, for example of manganese, iron, vanadium and copper, comprising specific chelants, capable of chelating at least one transition metal ion through either three or four nitrogen atoms, are effective for accelerating curing of oxidatively curable coating formulations.

Viewed from a first aspect, therefore, the invention provides a formulation comprising an oxidatively curable alkyd-based curable resin and a chelant, which is of formulae (I) or (I-B):

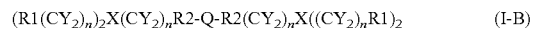

(wherein:

the or each X is N or CZ, wherein Z is selected from hydrogen, optionally $C_{1-6}$alkyl-substituted $C_{1-24}$alkyl, optionally $C_{1-6}$alkyl-substituted $C_{1-24}$alkyl-oxy-$C_{1-24}$alkyl, optionally $C_{1-6}$alkyl-substituted $C_{1-24}$alkyl-oxy-$C_{6-10}$aryl, optionally $C_{1-6}$alkyl-substituted $C_{1-24}$alkyl-O—$C_{6-10}$aryl $C_{1-24}$alkyl, optionally $C_{1-6}$alkyl-substituted hydroxy $C_{1-24}$alkyl, optionally $C_{1-6}$alkyl-substituted $C_{6-10}$aryl and optionally $C_{1-6}$alkyl-substituted $C_{6-10}$aryl$C_{1-24}$alkyl;

n is 0 if X=CZ and 1 if X=N;

each Y is independently selected from H, $CH_3$, $C_2H_5$ and $C_3H_7$;

each —R1 is independently selected from —$CY_2N(C_{1-24}$alkyl$)_2$; —$CY_2NR3$, in which R3 and the nitrogen atom N to which it is attached represent a heterocycloalkyl group optionally substituted with one or more $C_{1-6}$alkyl groups, which is connected to the adjacent $CY_2$ moiety through the nitrogen atom N; or represents an optionally $C_{1-6}$alkyl-substituted heteroaryl group selected from pyridin-2-yl, pyrazin-2-yl, quinolin-2-yl, pyrazol-1-yl, pyrazol-3-yl, pyrrol-2-yl, imidazol-2-yl, imidazol-4-yl, benzimidazol-2-yl, pyrimidin-2-yl, 1,2,3-triazol-1-yl, 1,2,3-triazol-2-yl, 1,2,3-triazol-4-yl, 1,2,4-triazol-1-yl, 1,2,4-triazol-3-yl and thiazol-2-yl;

both —R2- moieties, if present, are independently selected from an optionally $C_{1-6}$alkyl-substituted heteroarylene group selected from pyridin-2,6-diyl, pyrazin-2,6-diyl, quinolin-2,8-diyl, pyrazol-1,3-diyl, pyrrol-2,5-diyl, imidazol-1,4-diyl, imidazol-2,5-diyl, pyrimidin-2,6-diyl, 1,2,3-triazol-2,5-diyl, 1,2,4-triazol-1,3-diyl, 1,2,4-triazol-3,5-diyl and thiazol-2,4-diyl;

Q represents a bridge selected from the group consisting of a $C_{1-6}$alkylene moiety, a $C_{6-10}$arylene moiety or a moiety comprising one or two $C_{1-3}$alkylene units and one $C_{6-10}$arylene unit, which bridge is optionally substituted one or more times with independently selected $C_{1-24}$alkyl groups and OH groups);

or is of formulae (II), (II-B) or (II-C):

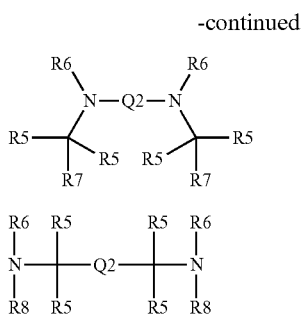

(wherein:

each —R5 independently is selected from —CH$_2$N(C$_{1-24}$alkyl)$_2$, —CH$_2$NR9 or an optionally C$_{1-6}$alkyl-substituted heteroaryl group selected from pyridin-2-yl, pyrazin-2-yl, quinolin-2-yl, pyrazol-1-yl, pyrazol-3-yl, pyrrol-2-yl, imidazol-2-yl, imidazol-4-yl, benzimidazol-2-yl, pyrimidin-2-yl, 1,2,3-triazol-1-yl, 1,2,3-triazol-2-yl, 1,2,3-triazol-4-yl, 1,2,4-triazol-1-yl, 1,2,4-triazol-3-yl and thiazol-2-yl);

the or each —R6 independently represents —R10-R11;

the or each —R7 and the or each —R8 each independently represents hydrogen, or a group selected from C$_{1-18}$alkyl, C$_{6-10}$aryl, C$_{5-10}$heteroaryl, C$_{6-10}$arylC$_{1-6}$alkyl and C$_{5-10}$heteroarylC$_{1-6}$alkyl, each of which groups may be optionally C$_{1-6}$alkyl-substituted, with the proviso that no —R7 or —R8 may be one of the possibilities permitted for —R5;

the or each —R10- independently represents optionally C$_{1-6}$alkyl-substituted C$_{1-6}$alkylene;

the or each —R11 independently represents hydrogen, C$_{1-6}$alkyl, optionally C$_{1-6}$alkyl-substituted C$_{6-10}$aryl, optionally C$_{1-6}$alkyl-substituted C$_{5-10}$heteroaryl, optionally C$_{1-6}$alkyl-substituted C$_{5-10}$heteroarylC$_{1-6}$alkyl, CY$_2$N(C$_{1-24}$alkyl)$_2$ group or CY$_2$NR9;

each —NR9 independently represents a moiety in which R9 and the nitrogen atom N to which it is attached represent a heterocycloalkyl group optionally substituted with one or more C$_{1-20}$alkyl groups, which is connected to the remainder of the chelant through the nitrogen atom N; and Q2 represents a bridge selected from the group consisting of a C$_{1-6}$alkylene moiety C$_{6-10}$arylene moiety or a moiety comprising one or two C$_{1-3}$alkylene units and one C$_{6-10}$arylene unit, which bridge is optionally substituted one or more times with independently selected C$_{1-24}$alkyl groups and OH groups).

The chelant in the formulation may or may not be part of a complex comprising a suitable transition metal ion. This is typically an ion of manganese, iron, copper or vanadium, more typically of manganese or iron and often of manganese.

Viewed from a second aspect, the invention provides a method of preparing a formulation according to the first aspect of the invention, the method comprising contacting a composition comprising an alkyd-based resin with a composition comprising a chelant of formulae (I), (I-B), (II), (II-B) or (II-C). The chelant in the composition comprising it may or may not be part of a complex comprising a suitable transition metal ion. This is typically an ion of manganese, iron, copper or vanadium, more typically of manganese or iron and often of manganese.

Viewed from a third aspect, the invention provides a composition resultant from curing a formulation of the first aspect of the invention, or from curing of a formulation obtainable according to the second aspect of the invention.

Viewed from a fourth aspect, the invention provides a kit comprising a formulation according to the first aspect of the invention or obtainable according to the second aspect of the invention, which formulation comprises less than 0.001% by weight of ions of each of at least manganese, iron, cobalt, vanadium and copper and, separately, a composition comprising transition metal ions selected from the group consisting of manganese, iron, vanadium and copper ions.

Viewed from a fifth aspect, the invention provides a method comprising applying to a substrate a formulation according to the first aspect of the invention, or obtainable according to the second aspect of the invention.

Further aspects and embodiments of the present invention will be evident from the discussion that follows below.

DETAILED DESCRIPTION OF THE INVENTION

As summarised above, the present invention is based, in part, on the recognition that complexes of transition metal ions (particularly although not necessarily of manganese and iron ions) and chelants, the chelants being of formula (I), (I-B), (II), (II-B) or (II-C), are effective for accelerating the curing of oxidatively curable alkyd-based resin formulations.

The oxidatively curable resin of the formulation is alkyd-based. As noted above, alkyd resins are a well-understood binder class used in film-forming coating compositions. The term coating composition is to be interpreted broadly and embraces, for example, varnishes, primary coats, filling pastes and glazes. Coating compositions may be solvent-based or water based, e.g. emulsions. Typical coating compositions comprise solvent-based air-drying coatings and/or paints for domestic use. According to particular embodiments of the present invention, the formulations of the invention (including the fully formulated oxidatively curable coating compositions described herein) are paints. The formulations of the invention (including the fully formulated oxidatively curable coating compositions described herein) may comprise inks, for example a metal plate ink, lithographic ink, relief printing ink, screen ink or offset overprinting ink.

By oxidatively curable alkyd-based resin formulations is meant herein liquids that form a continuous solid coating as a consequence of the course of oxidative reactions (curing) and, generally, evaporation of a liquid continuous phase (generally solvent).

Typically, curing results in formation of cross-linkages and other bond formations through reactions involving unsaturated components within alkyd-based resin formulations.

In alkyd-based resin formulations, also referred to herein as alkyd-based formulations, the major binder present is an alkyd. By binder is meant in the art and herein the film-forming (curable) component within curable compositions, i.e. the component within the compositions that forms the desired three-dimensional network upon curing.

Typically the curable component of an oxidatively curable composition (e.g. a formulation of the invention) will comprise between about 1 and about 98% by weight, for example between about 1 and about 90% by weight of the total weight of the composition, e.g. between about 20 and about 70% by weight of the total weight of the composition. At least 50% by weight of the oxidatively curable portion (i.e. of the binder) in an oxidatively curable alkyd-based resin, i.e. from about 50% by weight to about 100% by weight, is curable alkyd resin. Typically, at least 75% by weight of the binder in an oxidatively curable alkyd-based resin, i.e. from about 75% by weight to about 100% by weight (e.g. from about 90% by weight to about 100% by weight), is curable alkyd resin. According to particular embodiments, about 100% by weight of the binder in an oxidatively curable alkyd-based resin is curable alkyd resin. The balance, if any, of the curable (i.e. binder) component may be, for example, curable acrylate, urethane, polybutadiene and epoxy ester resins. The skilled person is aware that introducing quantities of curable binders other than curable alkyds allows the distinct properties of such binders to be introduced to a controllable degree into the ultimate coating resultant from application of a composition, such as an oxidatively curable composition, which may be made from the formulation of the invention.

As described above, oxidatively curable alkyd resins are a well-understood and indeed dominant binder in many oxidatively curable paints (both for commercial and domestic use) and other coating compositions. They are employed, in particular, in solvent-based coating compositions.

Alkyds (used synonymously herein with alkyd resins) are produced by the condensation, typically polycondensation, of polyols with carboxylic acids or anhydrides. To make them susceptible to the so-called drying process, some alkyd resins (i.e. those that are oxidatively curable, present in the formulation of the invention) are reacted with unsaturated triglycerides or other source of unsaturation. Plant and vegetable oils, such as linseed oil, are frequently used as the source of triglycerides. The term oxidatively curable alkyd resin thus generally refers in the art, and herein, to polyesters modified with fatty acids. As is known in the art, alkyd resins are generally prepared via condensation polymerisation reactions between three types of monomers: (i) one or more polyalcohols (also known as polyols), (ii) one or more polybasic acids (also known as polyacids); and (iii) long chain unsaturated fatty acids or triglyceride oils, which confer upon the alkyds the susceptibility towards curing.

Owing to its presence in naturally occurring oils, glycerol is a widely used polyol in the preparation of alkyds. Other examples of suitable polyhydric alcohols include: pentaerythritol, dipentaerythritol, ethylene glycol, diethylene glycol, propylene glycol, neopentyl glycol, trimethylol propane, trimethylol ethane, di-trimethylol propane and 1,6-hexane diol.

Polycarboxylic acids and the corresponding anhydrides, used to synthesise alkyds, comprise aromatic, aliphatic and cycloaliphatic components, which are generally derived from petrochemical feedstocks. Typical examples of such polyacids include: phthalic acid and its regioisomeric analogues, trimellitic acid, pyromellitic acid, pimelic acid, adipic acid, azelaic acid, sebacic acid, maleic acid, fumaric acid and tetra-hydrophthalic acid.

Suitable so-called drying and semi-drying fatty acids or mixture thereof, useful herein, are typically ethylenically unsaturated conjugated or non-conjugated $C_{2-24}$ carboxylic acids, such as oleic, ricinoleic, linoleic, linolenic, licanic acid and eleostearic acids or mixture thereof, typically used in the forms of mixtures of fatty acids derived from natural or synthetic oils.

By semi-drying and drying fatty acids is meant fatty acids that have the same fatty acid composition as the oils (i.e. the esters) from which they are derived. The classification of the oils is based on the iodine number: for a drying oil the iodine number is >140; for a semi-drying oil the iodine number is ranging between 125 and 140, and for a non-drying oil the iodine number is <125 (see "*Surface Coatings*", part 1, Chapman & Hall, London, page 55, 1993).

Typically, oxidatively curable alkyd-based formulations, both generally and according to the first aspect of the invention, are liquids. More typically still, such formulations are solvent-based, that is to say they comprise an organic solvent (which may be a mixture of solvents) for the binder and, in accordance with the first aspect of the invention, the chelant.

In other words, "solvent-based" implies to the skilled person in this context formulations that are based on organic (i.e. non-aqueous) solvents, i.e. comprising an organic solvent as a liquid continuous phase. Examples of suitable solvents include aliphatic (including alicyclic and branched) hydrocarbons, such as hexane, heptane, octane, cyclohexane, cycloheptane and isoparaffins; aromatic hydrocarbons such as toluene and xylene; ketones, e.g. methyl ethyl ketone and methyl isobutyl ketone; alcohols, such as secondary butanol, isopropyl alcohol, n-butyl alcohol and n-propyl alcohol, glycols such as propylene glycol; alcohol ethers and esters, glycol monoethers, such as the monoethers of ethylene glycol and diethylene glycol; monoether glycol acetates, such as 2-ethoxyethyl acetate; N-methylpyrrolidone; as well as mixtures thereof. Isomeric variants are included. Thus, for example, the term hexane embraces mixtures of hexanes. According to particular embodiments of the invention, the solvent is a hydrocarbyl (i.e. hydrocarbon) solvent, e.g. an aliphatic hydrocarbyl solvent, e.g. solvents comprising mixtures of hydrocarbons. Examples include white spirit and solvents available under the trademarks Shellsol, from Shell Chemicals and Solvesso and Exxsol, from Exxon.

Whilst according to many embodiments of the various aspects of the present invention compositions and formulations are solvent-based, water-based alkyd-based resin formulations and coating compositions are also well known and the compositions and formulations described herein may be water-based (i.e. comprise water as a continuous liquid phase). Accordingly, compositions and formulations described herein may be of alkyd-based resin formulations in the form of emulsions, and may thus comprise a suitable emulsifier, as is well known in the art.

When an alkyd-based formulation or composition is referred to herein as "oxidatively curable", it is to be understood that this term is being used to describe a composition susceptible to the reactions that occur between unsaturated groups (e.g. carbon-carbon double bonds) and oxygen from the air, which reactions constitute oxidative curing and are manifested in hardening and formation of solid coatings obtainable from such compositions or formulations. Thus, an oxidatively curable alkyd-based resin formulation is a formulation capable of oxidative curing, but which has not yet been allowed to cure. In contrast, the composition of the third aspect of the invention is directed towards formulations after curing, i.e. when cured. The formation of the desired coating resultant from curing may be accelerated through the use of catalytic drying, for example by transition metal-based driers, in particular transition metal-based driers comprising a chelant of formulae (I), (I-B), (II), (II-B) or (II-C).

A characteristic feature of the various aspects of the present invention is the use of a chelant of formulae (I), (I-B), (II), (II-B) or (II-C). Complexes comprising these chelants and one or more suitable transition metal ions, in particular ions of manganese, iron, vanadium and copper, more typically ions of manganese and iron, accelerate the curing of the oxidatively curable formulation of the invention, which acceleration is absent in the absence of suitable transition metal ions.

The nature of the chelants of formulae (I), (I-B), (II), (II-B) and (II-C) as hereinbefore defined will now be described. It will be understood that more than one such chelant may be used in accordance with the various aspects of the invention. Typically, however, only one kind of chelant will be used.

The chelants of formulae (I), (I-B), (II), (II-B) and (II-C) are capable of chelating at least one transition metal ion through either three or four nitrogen atoms, i.e. some of the chelants capable of chelating at least one transition metal ion through three nitrogen atoms and others are capable of chelating at least one transition metal ion through four nitrogen atoms. Some of the chelants described herein, in particular those of formulae (I-B), (II-B) and (II-C) may be capable of chelating one transition metal ion through three nitrogen atoms and another transition metal ions through four nitrogen atoms. Generally, however, where such chelants capable of chelating to transition metal ions, each transition metal ion is chelated by the same number of nitrogen atoms, generally because the chelants concerned are symmetrical about the bridge (Q or Q2).

By a chelant capable of chelating at least one transition metal ion through three nitrogen atoms is meant a polydentate ligand capable of chelating one or more transition metal ions by the formation of coordinate bonds between three nitrogen atoms of the chelant and a common transition metal ion, chelation herein and as the term is customarily used in the art requiring that three of the nitrogen atoms of the chelant coordinate to the same transition metal ion, generally (but not necessarily) a manganese or iron ion. Such chelants are thus at least tridentate. Some of these chelants may have a denticity of greater than three, however. For example, some of the chelants described herein, which are capable of chelating at least one transition metal ion through three nitrogen atoms, are hexadentate or heptadentate, capable of coordinating through six or seven nitrogen atoms. With these chelants, however, chelation is nevertheless still achieved by the formation of coordinate bonds between three nitrogen atoms and a common transition metal ion: for example three of the six or seven nitrogen atoms in these hexadentate or heptadentate chelants can chelate to a first transition metal ion and the three or four other donor nitrogen atoms can chelate to a second transition metal ion. This is generally achieved by such polydentate ligands having two portions of their structure giving rise to two separate regions of chelation, often separated by a bridge, as is explained and exemplified in greater detail herein with reference to specific polydentate ligands useful in accordance with the present invention.

For the avoidance of doubt, whilst the chelants described herein may have an overall denticity of greater than three or four, the phrase "chelant capable of chelating at least one transition ion through three nitrogen atoms" does not permit chelation through four (or more) or two (or fewer) nitrogen atoms. Likewise, the phrase "chelant capable of chelating at least one transition ion through for nitrogen atoms" does not permit chelation through five (or more) or three (or fewer) nitrogen atoms.

It will be understood that denticity refers to the number of metal ion-binding donor atoms that can bind to a metal ion. The chelants of formulae (I), (I-B), (II), (II-B) and (II-C) described herein, which are at least tridentate, coordinating through nitrogen donors, are organic molecules comprising at least three nitrogen atoms with lone pairs, which can bind to a common transition metal ion. These nitrogen donor atoms may be either aliphatic, part of a tertiary, secondary or primary amine, or may belong to a heteroaromatic ring, for example pyridine.

It will be understood that chelants of formula (I-B) are effectively dimers of chelants of formula (I) in which moiety —R2-Q-R2- takes the place of two R1 groups. Of the ligands of formulae (I) and (I-B), chelants of formula (I) are more typical.

The following features, alone or in combination, as the context permits (i.e. where not conflicting) are typical (but not essential) features of the chelants of formulae (I) and (I-B):

where there is more than one moiety having the same descriptor, e.g. X, Y, R1 and R2, moieties having the same descriptor are the same;

each Y, if present, is H;

the or each X is selected from the group N and CZ, wherein Z is selected from hydrogen, optionally $C_{1-6}$alkyl-substituted $C_{1-24}$alkyl, optionally $C_{1-6}$alkyl-substituted $C_{1-24}$alkyl-O—$C_{1-24}$alkyl, optionally $C_{1-6}$alkyl-substituted hydroxy$C_{1-24}$alkyl, and optionally $C_{1-6}$alkyl-substituted $C_{6-10}$aryl$C_{1-24}$alkyl, in particular wherein Z is hydrogen, $C_{1-24}$alkyl or $C_{6-10}$aryl$C_{1-24}$alkyl, even more particularly wherein X is N, or X is CZ wherein Z is hydrogen, $C_{1-18}$alkyl or $C_{6-10}$arylmethyl;

the or each X is N or X is CZ wherein Z is selected from H or $CH_3$, hydroxymethyl ($CH_2$—OH), methoxymethyl ($CH_2OCH_3$) and benzyl ($CH_2$—$C_6H_5$);

the or each X is N;

Q is selected from —$CH_2$—, —$CH_2CH_2$—, —$CH_2CH_2CH_2$—, —$CH_2CHOHCH_2$—, 1,2-phenylene and 1,4-phenylene, each of which is optionally $C_{1-6}$alkyl-substituted, with Q typically being unsubstituted;

both —R2- moieties are the same, for example pyridin-2,6-diyl, imidazol-1,4-diyl or imidazol-2,5-diyl, often pyridin-2,6-diyl;

where any —R1 moieties are —$CY_2N(C_{1-24}$alkyl$)_2$ or —$CY_2NR3$, typically —$CH_2N(C_{1-24}$alkyl$)_2$ or —$CH_2NR3$, the nitrogen-containing group attached to the $CY_2$ or $CH_2$ groups recited within these possibilities being independently selected from the group consisting of —$NMe_2$, —$NEt_2$, —$N(i-Pr)_2$,

each —R1 is optionally substituted pyridin-2-yl, imidazol-2-yl, imidazol-4-yl, benzimidazol-2-yl, more often optionally substituted pyridin-2-yl and particularly often each —R1 is unsubstituted pyridin-2-yl;

the or each —R1 is the same;

According to a specific embodiments, the chelant of formula (I) may be:

N,N,N-tris(pyridin-2-yl-methyl)amine (TPA), which has, for example, been described in U.S. Pat. No. 5,850,086 (Que, Jr. et al.) and U.S. Pat. No. 6,153,576 (Blum et al.);

tris(pyridin-2-yl)methane (Py3CH), which has, for example, been described by A J Canthy et al., *Inorg. Chem.*, 20, 2414 (1981); or the 6-methyl analogue of Py3CH, tris(6-methyl-pyridin-2-yl)methane (6(MePy)$_3$CH), which has, for example, been described by in a publication by M Kodera et al. (*Inorg. Chem.*, 39, 226 (2000)).

It will be understood that chelants of formulae (II-B) and (II-C) are effectively dimers of chelants of formula (II) in which bridge Q2 takes the place of the R8 groups, or the R7 groups respectively. Of the chelants of formulae (II), (II-B) and (II-C), chelants of formula (II) are most typical. Of the bridge-containing chelants, chelants of formula (II-B) are more typical than chelants of formula (II-C).

The following features, alone or in combination, as the context permits (i.e. where not conflicting) are typical (but not essential) features of the chelants of formulae (II), (II-B) and (II-C):

where there is more than one moiety having the same descriptor, e.g. R5, R6 (and, within the definition of R6, R10 and R11), R7 and R8, moieties having the same descriptor are the same;

R5 is optionally substituted pyridin-2-yl, in particular unsubstituted pyridin-2-yl;

in embodiments in which —R5 is —CY$_2$N(C$_{1-24}$alkyl)$_2$ or —CY$_2$NR9, typically —CH$_2$N(C$_{1-24}$alkyl)$_2$ or —CH$_2$NR9, the nitrogen-containing group attached to the CY$_2$ or methylene (—CH$_2$—) groups recited within these possibilities is selected from the group consisting of —NMe$_2$, —NEt$_2$, —N(i-Pr)$_2$,

the or each —R10- is —CH$_2$—;

the or each —R11 independently represents C$_{5-10}$heteroaryl, C$_{5-10}$heteroarylC$_{1-6}$alkyl, —CY$_2$N(C$_{1-24}$ alkyl)$_2$ or —CY$_2$NR9;

the or each —R11 is selected from —H, C$_{1-5}$alkyl, phenyl, —CY$_2$N(C$_{1-24}$alkyl)$_2$, —CY$_2$NR9 or an optionally C$_{1-6}$alkyl-substituted heteroaryl group selected from the group consisting of pyridin-2-yl, pyrazin-2-yl, quinolin-2-yl, pyrazol-1-yl, pyrazol-3-yl, pyrrol-2-yl, imidazol-2-yl, imidazol-4-yl, benzimidazol-2-yl, pyrimidin-2-yl, 1,2,3-triazol-1-yl, 1,2,3-triazol-2-yl, 1,2,3-triazol-4-yl, 1,2,4-triazol-1-yl, 1,2,4-triazol-3-yl and thiazol-2-yl;

the or each —R11 is selected from —H, phenyl, —CY$_2$N (C$_{1-8}$alkyl)$_2$ or —CY$_2$NR9, in which R9 and the nitrogen atom N to which it is attached represent an unsubstituted heterocycloalkyl group, which is connected to the remainder of the chelant through the nitrogen atom N;

the or each —R11 is an optionally alkyl-substituted heteroaryl group, typically optionally substituted pyridin-2-yl, and most typically unsubstituted pyridin-2-yl;

the or each —R11 is a moiety selected from —CY$_2$N (C$_{1-24}$alkyl)$_2$ or —CY$_2$NR9, typically —CH$_2$N (C$_{1-24}$alkyl)$_2$ or —CH$_2$NR9, in which the nitrogen-containing group attached to the CY$_2$ or methylene (—CH$_2$—) groups recited within these possibilities is selected from the group consisting of —NMe$_2$, —NEt$_2$, —N(i-Pr)$_2$,

the or each —R7 and the or each —R8 independently represents —H, or a group selected from C$_{1-6}$alkyl, C$_{6-10}$aryl and C$_{6-10}$arylC$_{1-6}$alkyl, each of which groups may be optionally C$_{1-6}$alkyl-substituted;

the or each —R7 is selected from —H, methyl and benzyl;

the or each —R8 is typically selected from —H, methyl, and benzyl, often methyl; and bridge Q2 is selected from —CH$_2$CH$_2$—, —CH$_2$CH$_2$CH$_2$—, —CH$_2$CHOHCH$_2$—, 1,2-phenylene and 1,4-phenylene, each of which is optionally C$_{1-6}$alkyl-substituted, with the bridge typically being unsubstituted.

bridge Q2 is —CH$_2$CH$_2$—

According to particular embodiments, the chelant of formula (II) is N-methyl-N-(pyridin-2-yl-methyl)-bis(pyridin-2-yl)methylamine (CH$_3$N$_3$py) or N-benzyl-N-(pyridin-2-yl-methyl)-bis(pyridin-2-yl)methylamine (BzN$_3$py), both which are disclosed by Klopstra et al. (*Eur. J. Inorg. Chem.*, 4, 846-856 (2006)). Additional examples of chelants of formula (II) include: N,N-dimethyl-bis(pyridin-2-yl)methylamine, N-methyl-N-(pyridin-2-yl-methyl-1,1-bis(pyridin-2-yl)-1-aminoethane, N-benzyl-N-(pyridin-2-yl-methyl-1,1-bis(pyridin-2-yl)-1-aminoethane, N-methyl-N-(pyridin-2-yl-methyl-1,1-bis(pyridin-2-yl)-2-phenyl-1-aminoethane and N-benzyl-N-(pyridin-2-yl-methyl-1,1-bis(pyridin-2-yl)-2-phenyl-1-aminoethane.

It will be understood that each of the bridge-containing chelants of formulae (I-B), (II-B) and (II-C) are capable of chelating two transition metal ions. Such polydentate chelants, as well as the other polydentate chelants may be readily accessed by the skilled person.

With regard to chelants of formula (I-B), various examples have been published in literature, for example 1,2-bis[2-bis(6-methyl-2-pyridyl)methyl)-6-pyridyl]ethane (M Kodera, et al., *J. Am. Chem. Soc.*, 121, 11006 (1999)), 1,2-bis[2-bis(6-methyl-2-pyridyl)(6-pyridyl)-1,1,1-ethyl] ethane (M Kodera, et al., *Angew. Chem., Int. Ed. Engl.*, 43, 334 (2004)), 1,2-bis[2-bis(2-pyridylmethyl)aminomethyl]-6-pyridyl]ethane (M Kodera, et al., *Angew. Chem., Int. Ed. Engl.*, 44, 7104 (2005). An ethylene-bridged TPA ligand (with the ethylene bridge bound to the pyridin-2-yl groups on the 5 position), has been described by K D Karlin et al. (*Inorg. Chem.* 33, 4625 (1994) and *J. Am. Chem. Soc.*, 117, 12498 (1995)).

With regard to chelants of formula (II-B), the skilled person will recognise, for example, that N-(pyridin-2-yl-methyl)-bis(pyridin-2-yl)methylamine (N$_3$py) (the synthesis of which is described by G Roelfes et al. (*J. Am. Chem. Soc.*, 122, 11517-11518 (2000)), may be reacted with, 1,2-dibromoethane, for example to yield 1,2-bis(N-(pyridin-2-yl-methyl)-bis(pyridin-2-yl)methylamine)-ethane, analogously to the synthesis of the bridged TACN ligands described by K-O Schaefer et al. (supra) or the procedure described by M Klopstra et al. (supra) involving reaction N$_3$py with benzylchloride to produce BzN$_3$py.

With regard to chelants of formula (II-C), the skilled person will recognise, for example, that N-methyl-N-(pyridin-2-yl-methyl)-bis(pyridin-2-yl)methylamine (CH$_3$N$_3$py) (the synthesis of which is described by M Klopstra et al. (supra) may be reacted with BuLi at low temperature and then with dibromoethane, for example, to yield the bridged ligand, analogously to the synthesis of MeN4py and benzylN4py described elsewhere (see for example EP 0909809B).

According to particular embodiments of all aspects of the present invention, the chelant is of formula (I) or formula (II).

The chelant of formulae (I), (I-B), (II), (II-B) or (II-C) is typically present in formulations according to the present invention in concentrations of from 0.00005 to 0.5% by weight, often from 0.0001 to 0.1% by weight.

Where percentages by weight are referred to herein (wt % or % w/w), these mean, unless a context clearly dictates to the contrary, percentages by weight with respect to the binder component (i.e. the alkyd-based resin and any other binders present). With an oxidatively curable alkyd-based coating formulation, for example, the combined weights of the binders are those with respect to which weight percentages herein are based. For example, where a formulation according to the first aspect of the invention comprises 0.00005% w/w of chelant of formulae (I), (I-B), (II), (II-B) or (II-C), this is with respect to the weight of the curable components of the composition (i.e. the weight of the binder(s)).

Often, formulations of the first aspect of the invention will comprise a complex of the chelant of formulae (I), (I-B), (II), (II-B) or (II-C) with a suitable transition metal ion, typically one or two transition metal ions. These are typically ions of manganese, iron, copper or vanadium, more typically of manganese or iron and often of manganese. Where complexes comprise more than one transition metal ions, these ions are normally the same.

According to some embodiments, the formulations do not comprise a complex of a chelant of formulae (I), (I-B), (II), (II-B) or (II-C). This is because we have recognised that there can be technical advantageousness in providing an oxidatively curable alkyd-based resin formulation comprising a chelant (used interchangeably herein with the term "chelating agent") of formulae (I), (I-B), (II), (II-B) or (II-C), which formulation is essentially absent at least manganese, iron, cobalt, vanadium and copper ions. These, ions, if present in the formulation, can form together with the chelant a metal drier capable of accelerating oxidative curing.

A manufacturer of an alkyd-based resin formulation suitable for oxidative curing can thus include a chelant of formulae (I), (I-B), (II), (II-B) or (II-C) in an amount appropriate for a given oxidatively curable alkyd-based resin formulation. Each type of oxidatively curable alkyd-based resin can, and typically does, have different sensitivity towards radical curing and may thus require a particular concentration of a metal drier for optimal curing. However, to determine the appropriate concentration in practice is not straightforward, since a metal drier, for example a manganese-based or iron-based catalyst, can initiate radical curing before the coating composition (e.g. paint) comprising an oxidatively curable alkyd-based resin formulation (and other components) can be applied, leading to undesirable degradation and/or hardening of the resin formulation. In contrast, a manufacturer of an oxidatively curable alkyd-based resin formulation, as opposed to the manufacture of a fully formulated oxidatively curable coating composition comprising such an oxidatively curable alkyd-based resin formulation, can determine the optimum amount of metal drier for a given alkyd-based resin formulation and add to batches of it a suitable amount of chelant of formulae (I), (I-B), (II), (II-B) or (II-C) (but not the transition metal ions that allow formation of a catalytically active drier, which are often, but not necessarily, manganese, iron, cobalt, vanadium or copper ions). An appropriate quantity of transition metal ions salt (typically a manganese or iron salt) can then be added to the resultant formulation by, for example, a manufacturer of a fully formulated coating composition, along with other components to make a fully formulated oxidatively curable coating composition.

Mixing a chelant of formulae (I), (I-B), (II), (II-B) or (II-C) with an alkyd-based resin formulation in the essential absence of at least manganese, iron, cobalt, vanadium and copper ions which, if present, render these chelants catalytically active as metal driers, affords a formulation at least less susceptible to skinning or instability without the requirement to add antiskinning agents and/or to take other specific measures to avoid skinning (although doing one or both of these things is not precluded). Such formulations thus constitute particular embodiments of the first aspect of the invention.

Moreover, we have found that mixing of appropriate chelants of formula (I), (I-B), (II), (II-B) and (II-C) with alkyd-based resin formulations in the essential absence of at least manganese, iron, cobalt, vanadium and copper ions has a second advantage: we have found that, when formulations of the invention are prepared by contacting a chelant of formulae (I), (I-B), (II), (II-B) or (II-C) with an alkyd-based resin formulation in the essential absence of at least manganese, iron, cobalt, vanadium and copper ions, the resultant formulations, after they have been contacted with a suitable source of transition metal ions, e.g. a source of iron or manganese ions, cure more quickly than similar formulations that are prepared by contacting a composition comprising an alkyd-based resin with a composition comprising a well-defined complex comprising the same chelant of formulae (I), (I-B), (II), (II-B) or (II-C). Such formulations thus constitute further particular embodiments of the first aspect of the invention.

By well-defined complex is meant herein (as the term is used customarily in the art) a complex that has been isolated such that it is susceptible to characterisation (i.e. definition) and analysis (e.g. to determine its structure and degree of purity). In contrast, a complex that is not well-defined is one that is prepared without isolation from the medium (e.g. reaction medium) in which it is prepared. That those formulations according to the first aspect of the invention prepared other than from well-defined complexes cure more quickly than well-defined complexes is particularly surprising. Such formulations are described in further detail below, in connection with the method of the second aspect of the invention.

The embodiments of the formulation of the first aspect of the invention that are essentially absent at least manganese, iron, cobalt, vanadium and copper ions comprise less than 0.001% by weight of at least ions of each of manganese, iron, cobalt, vanadium and copper. By this is meant that the formulation of the invention is absent 0.001% by weight manganese ions, absent 0.001% by weight iron ions, absent 0.001% by weight cobalt ions, absent 0.001% by weight vanadium ions and absent 0.001% by weight copper ions. An appropriate quantity of suitable transition metal cations (e.g. ions of one or more of manganese, iron, vanadium and copper) can be added after preparation of such a formulation, for example when introducing optional additional components to form an oxidatively curable coating composition.

Particular formulations of the invention can if desired comprise less than 0.0001% by weight of each of at least manganese, iron, cobalt, vanadium and copper ions. Still other embodiments of formulations of the invention comprise less than 0.001% by weight of each of manganese, iron, cobalt, vanadium, copper, titanium, molybdenum, tungsten, cerium and zirconium. Still other embodiments of formulations of the invention comprise less than 0.0001% by weight of each of manganese, iron, cobalt, vanadium, copper, titanium, molybdenum, tungsten, cerium and zirconium.

Ideally, embodiments of the formulation of the invention with concentrations of specific transition metal ions of less than 0.001 wt % or 0.0001 wt % are absent any of the transition metal ions specified. Obviously, however, this is in practice impossible to achieve. Accordingly, these formulations are preferably absent of the transition metal ions specified to the greatest extent practicable.

In order to make, in accordance with a method of the second aspect of the invention, a formulation according to the first aspect of the invention, a composition comprising an oxidatively curable alkyd-based resin is contacted with a composition comprising a chelant of formulae (I), (I-B), (II), (II-B) or (II-C). The composition comprising the chelant of formula (I), (I-B), (II), (II-B) or (II-C) that is contacted with the composition comprising the alkyd-based resin may, in some embodiments, comprise a transition metal ion-containing complex comprising the chelant. This may be a well-defined complex or one that is not well-defined. Further, a mixture of well-defined complex and a non-complexed chelant of formulae (I), (I-B), (II), (II-B) or (II-C) may be employed in the composition comprising the alkyd-based resin. In other embodiments, the composition comprising the chelant of formulae (I), (I-B), (II), (II-B) or (II-C) is not part of a transition metal ion-containing complex, in which case a source of transition metal ions may, if wished, be added afterwards (or indeed have been formulated together with the alkyd-based resin before addition of the chelant of formulae (I), (I-B), (II), (II-B) or (II-C)) so as to form a complex comprising the chelant of formulae (I), (I-B), (II), (II-B) or (II-C) in situ (i.e. within the alkyd-based resin formulation). It will be understood that such a complex may be regarded as not well-defined. Both of these different types of embodiments are described below.

The typical molar ratio between any transition metal ions and the chelant is between about 0.1:1 and about 10:1, often between about 0.3:1 and about 3:1. Often, the molar ratio between chelant and transition metal ions will be approximately between 1:2 and 1:1. However, this need not necessarily be the case. Without being bound to theory, an excess of transition metal ions may be beneficial to allow some adsorption on solid particles without losing too much siccative activity. On the other hand, a stoichiometric excess of chelant may be beneficial to improve regeneration of catalytically active species during curing, which can lead to improved drying (i.e. curing) performance despite using a lower quantity of transition metal ions. Using a stoichiometric excess of chelant can also be advantageous by reducing the intensity of coloured metal complexes. The skilled person will be able to take into account these considerations when preparing oxidatively curable coating compositions, for example formulations of the invention.

The contacting of the method of the first aspect of the invention may be during formulation of fully formulated oxidatively curable alkyd-based resin coating compositions (described below), particularly if the chelant of formulae (I), (I-B), (II), (II-B) or (II-C) is part of a complex comprising a suitable transition metal ion.

If the chelant of formulae (I), (I-B), (II), (II-B) or (II-C) is introduced as a transition metal ion-containing complex, the complex may, for example, be either a well-defined complex or prepared, for example, by contacting a chelant of formula (I) with a suitable transition metal salt in a suitable solvent, by which is meant that either or both of the chelant and transition metal salt may be in a suitable solvent prior to contact with each other. The salt can be a soap. The resultant complex-containing mixture may then be contacted with a composition comprising an oxidatively curable alkyd-based resin, which is typically dissolved in an organic solvent described above when describing solvent-based alkyd-based formulations (or emulsified in a water-based liquid such as those described above when describing water-based alkyd-based formulations).

It will be understood from the discussion above concerning the formulations of the first aspect of the invention that, where a complex that is not well-defined is contacted with a composition comprising an alkyd-based resin, in accordance with the method of the second aspect of the invention, such embodiments are noteworthy in relation to both the first and second aspect of the invention. According to such embodiments, there is provided a formulation according to the first aspect of the invention that is obtainable by carrying out a method of the second aspect of the invention in which the chelant is not part of a well-defined complex comprising a suitable transition metal ion (e.g. an ion selected from the group consisting of ions of manganese, iron, vanadium and copper, e.g. a manganese or iron ion). Alternatively, such formulations may be regarded as being obtainable by a method of the second aspect of the invention, the method further comprising providing the chelant of formula (I), (I-B), (II), (II-B) or (II-C) as a complex that is obtained, or obtainable, by contacting a chelant of formula (I), (I-B), (II), (II-B) or (II-C) with a suitable transition metal salt (which may be a soap) in a suitable solvent. Typically, the resultant mixture is contacted, as is (i.e. without further manipulation, including purification), with the composition comprising the alkyd-based resin. In other words, particular embodiments of the second aspect of the invention comprise contacting the composition comprising the alkyd-based resin with a mixture of a chelant of formula (I), (I-B), (II), (II-B) or (II-C) and a suitable transition metal ion-containing salt, typically of a manganese, iron, vanadium or copper ion.

Often, the metal salt used will be a manganese salt, typically of a divalent or trivalent redox state. Upon contacting the manganese (or other transition metal ion) salt with the chelant, formation of manganese ion-chelant complexes (or other transition metal ion-chelant complexes) takes place.

The transition metal salt used can be a solid, a suspension, or as a solution in a variety of solvents. Typically the salt comprises a manganese (II) or manganese (III) ion although other salts, e.g. manganese (IV) (or other transition metal ion) salts may also be used. Such salts can be added as solids, suspensions, or as solutions in a variety of solvents. The invention contemplates use of a mixture of metal salts although a single salt is typically used.

Adding the chelant as a solution can be advantageous in permitting improved and/or easier mixing with the (solution of) binder(s). It may be beneficial to dilute chelant in a suitable solvent before adding to the binder if it is wished to introduce a very small amount of chelant, so greater accuracy of dosing can be achieved. Depending on the properties of the chelant and the desired resin-chelant formulation, suitable solvents include aliphatic hydrocarbons, such as heptanes, ethers, such as Dipropylene Glycol Methyl Ether in Dowanol DPM™ (Dow) or Propylene Glycol Methyl Ether in Dowanol PM™ (Dow), water, alcohols, such as ethanol or propylene glycol, or mixtures thereof. The skilled person will be able to easily formulate such solutions, generally using solvent such as those described above.

Where chelants are used, these may be provided as salts, in which one or more of the nitrogen atoms present protonated. Generally, it is desirable to neutralise these protonated salts in order that the chelants are able to chelate to a manganese ion. This may be achieved in a straightforward manner by contacting the salt of the chelate with a suitable base, for example sodium hydroxide or potassium hydroxide. For example, in the experimental section below, use of the chelant N,N,N-tris(pyridin-2-ylmethyl)amine in the form of its perchloric acid salt (TPA.3HClO$_4$) is described. When using this salt, three molar equivalents of potassium or sodium hydroxide may be used in order to neutralise the perchloric acid salt. This neutralising step may be carried out prior to the method of the second aspect of the invention (i.e. before the composition comprising the alkyd-based resin is contacted with the chelant of formulae (I), (I-B), (11), (II-B) or (II-C)) or as part of the method itself.

It will be understood that there is no particular limitation as to the source of the transition metal ions. Typically, however, where the transition metal ions are manganese or iron salts, salts are selected from the group consisting of optionally hydrated $MnCl_2$, $FeCl_2$, $FeCl_3$, $MnBr_2$, $Mn(NO_3)_2$, $Fe(NO_3)_3$, $MnSO_4$, $FeSO_4$, $(Fe)_2(SO_4)_3$, Mn(acetylacetonate)$_2$, Fe(acetylacetonate)$_2$, Mn(acetylacetonate)$_3$, Fe(acetylacetonate)$_3$, $Mn(R_4COO)_3$ (including Mn(acetate)$_3$), $Fe(R_4COO)_3$, $Mn(R_4COO)_2$ (including Mn(acetate)$_2$) and $Fe(R_4COO)_2$ (including Fe(acetate)$_2$, wherein $R_4$ is selected from a $C_{1-24}$alkyl. Where the salt comprises two $R_4$ groups, these can be the same or different. The alkyl moieties, by which is meant saturated hydrocarbyl radicals, may be straight-chain or comprise branched and/or cyclic portions. Indeed, throughout the specification, where reference is made to alkyl, unless the context dictates to the contrary, this means a $C_{1-24}$alkyl, which may be straight-chain or branched and may be cycloalkyl or comprise a cyclic portion (e.g. alkyl may be cyclohexylmethyl), for example $C_{1-10}$alkyl or $C_{1-6}$alkyl, e.g. methyl.

Often, the metal salt is selected from $Mn(R_4COO)_2$ and $Fe(R_4COO)_2$, particularly with $R_4COO(^-)$ being selected from acetate, octanoate, 2-ethylhexanoate, neodecanoate (3,3,5,5-tetramethylhexanoate), and naphthenate. When an iron salt is used, this is often selected from iron(acetate)$_2$, iron(octanoate)$_2$, iron(naphthenate)$_2$, iron(2-ethylhexanoate)$_2$ and iron(neodecanoate)$_2$. The invention also contemplates use of a mixture of different redox states of the metal ions with the same counterion, for example a mixture of manganese(II)(2-ethylhexanoate)$_2$ and manganese(III)(2-ethylhexanoate)$_3$.

The term optionally hydrated is well known in the art. Metal salts often contain water molecules within a crystal lattice, which will remain present unless the hydrated metals salts are subjected to specific drying steps by heating or drying under reduced pressure. However, partially or fully dehydrated metal salts can also be used. For example, manganese (II) acetate, and manganese (II) chloride can be bought as tetrahydrate salts or as dehydrated salts. Commercial manganese (II) sulfate is available in both tetrahydrate and monohydrate forms.

Often these transition metal salts are commercially available as solutions, particularly if they are of the formulae $Mn(R_4COO)_2$ or $Fe(R_4COO)_2$ described above, for example in hydrocarbon solutions to facilitate dissolution in the solvent-based curable compositions such as paint formulations. However, other solvents may also be used, including alcohols and water (or aqueous solutions), especially for chloride, sulfate and acetate salts of manganese and iron.

Formulations of the invention that comprise less than 0.001% (or 0.0001%) by weight of ions of each of at least manganese, iron, cobalt, vanadium and copper may be prepared by contacting chelant of formulae (I), (I-B), (II), (II-B) or (II-C) with (e.g. adding it to) an oxidatively curable alkyd-based binder, typically dissolved in an organic solvent described above (or emulsified in a water-based liquid), as described above. The chelant may be added as a pure material to the resin(s), or as a solution. Adding the chelant as a solution can be advantageous in permitting improved and/or easier mixing with the (solution of) binder(s). It may be beneficial to dilute chelant in a suitable solvent before adding to the binder if it is wished to introduce a very small amount of chelant, so greater accuracy of dosing can be achieved. Depending on the properties of the chelant and the desired resin-chelant formulation, suitable solvents include aliphatic hydrocarbons, such as heptanes, water, alcohols, such as ethanol or propylene glycol, or mixtures thereof. The skilled person will be able to easily formulate such solutions, generally using a solvent such as those described above.

It will be understood from the discussion above concerning the formulations of the invention that, where formulations are prepared in this way, such embodiments are noteworthy in relation to both the first and the second aspect of the invention.

Thus, as described herein, formulations of the invention comprising transition metal ion-containing complexes of the chelant of formulae (I), (I-B), (II), (II-B) or (II-C) can be prepared, either by contacting an alkyd-based resin composition with such a complex directly, or by contacting an alkyd-based resin composition with chelant that is not part of such a complex and then adding to the resultant formulation a source of transition metal ions. As a still further embodiment of the method of the second aspect of the invention, an alkyd-based resin composition comprising suitable transition metal ions may be contacted with the chelant of formulae (I), (I-B), (II), (II-B) or (II-C). Generally, formulations of the invention comprising transition metal ions comprise a concentration of between about 0.0003 wt % and about 0.07 wt %, for example about 0.0005 wt % and about 0.05 wt %, e.g. between about 0.002 wt % and about 0.05 wt %, of the suitable transition metal ion, such as those described immediately below.

Transition metal ions to which the chelants of formulae (I), (I-B), (II), (II-B) or (III-C) may coordinate, to provide metal driers (transition metal ion-containing complexes that can accelerate curing of the oxidatively curable alkyd-based resin in the formulation of the invention) may be, according to particular embodiments, manganese and iron ions, or mixtures of any these metal ions. The valency of the metal ions may range from +1 to +6, often from +2 to +5. Examples include metal ions selected from the group consisting of Mn(II), Mn(III), Mn(IV), Mn(V), Fe(II), Fe(III), Fe(IV), and Fe(V), for example metal ions selected from the group consisting of Fe(II), Fe(III), Mn(II), Mn(III), and Mn(IV).

In complexes comprising the chelant of formulae (I-B), (II-B) or (II-C), the number of metal ions per chelant molecule may be either 1 or 2. Since chelants of formulae (I-B), (II-B) and (II-C) contain two tridentate or tetradentate nitrogen donor moieties, each tridentate or tetradentate nitrogen donor moiety may bind to one manganese or iron ion. Thus one may obtain a molar ratio of the chelant of formulae (I-B), (II-B) or (II-C) to metal ion of 1:2. Also one may obtain complexes or species whereby one chelant of formulae (I-B), (II-B) or (II-C) containing two tridentate or tetradentate nitrogen donor moieties binds to only one metal ion, for example if a molar excess of chelant of formulae (I-B), (II-B) or (II-C) is employed. In this way, there is provided a molar ratio of the chelant of formulae (I-B), ((II-B) or (II-C) to metal ion of 1:1, and one of the tridentate or tetradentate nitrogen donor moieties will not participate in coordination to a manganese or iron ion.

Complexes comprising a chelant of formulae (I), (I-B), (II), (II-B) or (II-C) may, for example, be of the generic formula (III):

$$[M_a L_k X_n] Y_m \quad (III)$$

in which:

M represents an ion selected those of manganese, iron, vanadium and copper;

each X independently represents a coordinating species selected from any mono-, bi-, or tri-charged anions and any neutral molecule able to coordinate a metal ion M in a mono-, bi- or tridentate manner;

each Y is independently a non-coordinating counterion;

a represents an integer from 1 to 10;

k represents an integer from 1 to 10;

n represents an integer from 1 to 10;

m represents an integer from 1 to 20; and

L represents a chelant of formulae (I), (I-B), (II), (II-B) or (II-C)

or a hydrate thereof.

Generally, M in formula (III) represents a transition metal ion selected from Mn(II), Mn(III), Mn(IV), Mn(V), Fe(II), Fe(III), Fe(IV) and Fe(V).

According to particular embodiments of formula (III) (including those embodiments in which M represents a transition metal ion selected from Mn(II), Mn(III), Mn(IV), Mn(V), Fe(II), Fe(III), Fe(IV) and Fe(V)), alone or in combination (where the context permits):

M represents a metal ion selected from Fe(II), Fe(III), Mn(II), Mn(III), and Mn(IV);

X represents a coordinating species selected from $O^{2-}$, $[R^6BO_2]^{2-}$, $R^6COO^-$, $[R^6CONR^6]^-$, $OH^-$, $NO_3^-$, NO, $S^{2-}$, $R^6S^-$, $PO_4^{3-}$, $HPO_4^{2-}$, $H_2PO_4^-$, $[PO_3OR^6]^{3-}$, $H_2O$, $CO_3^{2-}$, $HCO_3^-$, $R^6OH$, $NR^6R^7R^8$, $R^6OO^-$, $O_2^{2-}$, $O_2^-$, $R^6CN$, $Cl^-$, $Br^-$, $I^-$, $OCN^-$, $SCN^-$, $CN^-$, $N_3^-$, $F^-$, $RO^-$, $ClO_4^-$, $CF_3SO_3^-$;

Y represents a counterion selected from $ClO_4^-$, $CF_3SO_3^-$, $[B(R^6)_4]^-$, $[FeCl_4]^-$, $PF_6^-$, $R^6COO^-$, $NO_3^-$, $RO^-$, $N^+R^6R^7R^8R^9$, $Cl^-$, $Br^-$, $I^-$, $F^-$, $S_2O_6^{2-}$, $OCN^-$, $SCN^-$, $H_2O$, $BF_4^-$, $SO_4^{2-}$, $R^6$, $R^7$, $R^8$ and $R^9$ each independently represents hydrogen, optionally substituted alkyl or optionally substituted aryl;

a represents an integer from 1 to 4;

k represents an integer from 1 to 10;

n represents an integer from 1 to 4; and m represents an integer from 1 to 8.

As used herein, within the definitions provided above for formula (III) and elsewhere, unless a context expressly dictates to the contrary, the following definitions apply:

By alkyl is meant herein a saturated hydrocarbyl radical, which may be straight-chain, cyclic and/or branched. By alkylene is meant an alkyl group from which a hydrogen atom has been formally abstracted. Typically alkyl and alkylene groups will comprise from 1 to 25 carbon atoms, more usually 1 to 10 carbon atoms, more usually still 1 to 6 carbon atoms. The simplest alkylene group is methylene (—$CH_2$—).

Aromatic moieties may be polycyclic, i.e. comprising two or more fused (carbocyclic) aromatic rings. Typically aryl groups will comprise from 1 to 14 carbon atoms.

The simplest aryl group is phenyl. Naphthalene and anthracene are examples of polycyclic aromatic moieties.

Heteroaromatic moieties are aromatic, heterocylclic moieties, which comprise one or more heteroatoms, typically oxygen, nitrogen or sulfur, often nitrogen, in place of one or more ring carbon atoms and any hydrogen atoms attached thereto, in a corresponding aromatic moiety. Heteroaromatic moieties, for example, include pyridine, furan, pyrrole and pyrimidine. Benzimidazole is an example of a polycyclic heteroaromatic moiety.

Aryl radicals and arylene diradicals are formed formally by abstraction of one and two hydrogen atoms respectively from an aromatic moiety. Thus phenyl and phenylene are the aryl radical and arylene diradical corresponding to benzene. Analogously, pyridyl and pyridylene (synonymous with pyridindiyl) are the heteroaryl radical and heteroarylene diradical corresponding to pyridine. Unless a context dictates to the contrary, pyridyl and pyridylene are typically 2-pyridyl and pyridine-2,6-diyl respectively.

By heterocycloalkane is meant a cycloalkane, typically a $C_{5-6}$cycloalkane, in which one or more $CH_2$ moieties are replaced with heteroatoms, typically selected from the group consisting of nitrogen, oxygen and sulfur. Where a heteroatom is nitrogen, it will be understood that the $CH_2$ moiety is formally replaced with NH, not N. By heterocycloalkyl is meant herein a radical formed formally by abstraction of a hydrogen atom from a heterocycloalkane. Typical examples of heterocycloalkyl groups are those in which the heterocycloalkyl is formed formally by abstraction of a hydrogen atom from the nitrogen atom. Typical heterocycloalkyl groups include pyrrolidin-1-yl, piperidin-1-yl and morpholin-4-yl, i.e. in which the heterocycloalkyl is formed formally by abstraction of a hydrogen atom from the nitrogen atom of the parent heterocycloalkane.

By arylalkyl is meant aryl-substituted alkyl. Analogously, by aminoalkyl is meant amino-substituted alkyl, by hydroxyalkyl is meant hydroxy-substituted alkyl and so on.

Various alkylene bridges are described herein. Such alkylene bridges are typically although not necessarily straight chain alkylene bridges. They may, however, be cyclic alkylene groups (e.g. a $C_6$alkylene bridge may be cyclohexylene, and if so is typically cyclohexyl-1,4-ene). Where a bridge is, for example, a $C_{6-10}$arylene bridge, this may be, for example, phenylene or the corresponding arylene formed by abstraction of two hydrogen atoms from naphthalene. Where a bridge comprises one or two $C_{1-3}$alkylene units and one $C_{6-10}$arylene unit, such bridges may be, for example, —$CH_2C_6H_4CH_2$— or —$CH_2C_6H_4$—. Where present, phenylene is typically phenyl-1,4-ene. It will be understood that each of these bridges may be optionally substituted one or more times, for example once, with independently selected $C_{1-24}$alkyl (e.g. $C_{1-18}$ alkyl) groups.

By alkyl ether is meant a radical of the formula -alkylene-O-alkyl, wherein alkylene and alkyl are as herein defined.

Where an alkyl or aryl group is optionally substituted, this may be, unless a context expressly dictates otherwise, with one or more substituents independently selected from the group consisting of -halo, —OH, —$OR^{10}$, —$NH_2$, —$NHR^{10}$, —$N(R^{10})_2$, —$N(R^{10})_3^+$, —$C(O)R^{10}$, —OC(O)

$R^{10}$, $-CO_2H$, $-CO_2^-$, $-CO_2R^{10}$, $-C(O)NH_2$, $-C(O)NHR^{10}$, $-C(O)N(R^{10})_2$, -heteroryl, $-R^{10}$, $-SR^{10}$, $-SH$, $-P(R^{10})_2$, $-P(O)(R^{10})_2$, $-P(O)(OH)_2$, $-P(O)(OR^{10})_2$, $-NO_2$, $-SO_3H$, $-SO_3$, $-S(O)_2R^{10}$, $-NHC(O)R^{10}$ and $-N(R^{10})C(O)R^{10}$, wherein each $R^{10}$ is independently selected from alkyl, aryl, aralkyl optionally substituted one or two or more times with a substituent selected from the group consisting of -halo, $-NH_3^+$, $-SO_3H$, $-SO_3^-$, $-CO_2H$, $-CO_2^-$, $-P(O)(OH)_2$, $-P(O)(0-)_2$.

Where a particular moiety described herein is stated to be optionally substituted, for example with a $C_{1-6}$ alkyl group, one or more such substituents may be present, on any of the parts of the moiety so substituted. For example, where reference is made to an optionally $C_{1-6}$alkyl-substituted $C_{6-10}$aryl$C_{1-24}$alkyl, either the $C_{6-10}$aryl portion or the $C_{1-24}$alkylene portion, or both, may be substituted with one or more $C_{1-6}$alkyl groups. Typically, however in such instances, the particular moiety is only substituted once.

According to particular embodiments, a=1 or 2 and k=1 or 2.

As is known, the ability of metal driers to catalyse the curing of oxidatively curable coating compositions arises from their ability to participate in redox chemistry: the nature of the counterion(s) Y are not of great importance. The choice of these may be the affected by the solubility of the complex of metal ions and chelant of formulae (I), (I-B), (II), (II-B) or (II-C) in a given formulation or composition. For example, counterion(s) Y such as chloride, sulfate or acetate may serve to provide a readily water-soluble complex, if a water-based paint is desired. When using solvent-based (i.e. non-aqueous) compositions, it may be desirable to use larger, less popular counterions such as 2-ethylhexanoate. Suitable counterion(s) Y (and coordinating species X) may be selected without difficulty by the skilled person.

According to particular embodiments, X and Y may be independently selected from the group consisting of bromide, iodide, nitrate, sulfate, methoxide, ethoxide, formate, acetate, propionate, 2-ethylhexanoate, octanoate, neodecanoate (3,3,5,5-tetramethylhexanoate), naphthenate, oxide, and hydroxide.

An example of a neutral molecule able to coordinate the metal is acetonitrile, for example, to afford a complex of the formula $[ML(CH_3CN)_2]C_{12}$.

It will be understood that counterions Y serve to balance the charge resultant from the complex formed by the metal ion(s) M, coordinating species X and chelant(s) L. Thus, if the charge on the complex is positive, there will be one or more anions Y. Conversely, there will be one or more cations Y if the charge on the complex is negative.

When mononuclear siccatives according to formula (III) are used, these are preferably present as the following forms: $[MnLCl_2]$, $[MnL(NO_3)]ClO_4$, $[MnLBr_2]$, $[FeLCl_2]$, $[FeL(CH_3CN)_2]Cl_2$, and $[MnL(CH_3CN)_2]Cl_2$.

It will be understood from the foregoing discussion that complexes of formula (III) embrace dinuclear complexes (i.e. comprising two transition metal ions M), such as those containing hydroxide, oxo, carboxylate or halide as bridging ligands (with a bridging ligand indicated with p). If the chelants according formulae (I-B), (II-B) or (II-C) bind to two transition metal ions according to the usual manner, each via 3 or 4 nitrogen donor per metal ion, one or two bridging molecules may be present. A combination of bridging and non-bridging ligands X may be present. Non-limiting examples of dinuclear manganese and iron complexes include $[LMn(\mu\text{-}O)_2MnL]Y_3$ or $[LFe(\mu\text{-}O)(\mu\text{-}RCOO)FeL](Y)_2$, $[LFe(\mu\text{-}O)(\mu\text{-}RCOO)FeL](Y)_3$, $[LFe(X)(\mu\text{-}O)Fe(X)L](Y)_3$, $[LFe(\mu\text{-}O)FeL](Y)_3$, $[LFe(\mu\text{-}OH)_2FeL](Y)_3$, L being a chelant according to formulae (I), (I-B), (II), (II-B) or (II-C), X=$H_2O$, $OH^-$, $Cl^-$, Mn in its III or IV oxidation state, and Fe in its II or III oxidation state. The metal-ligand complex, containing suitable counterion(s) Y, can be contacted with (e.g. added to) an alkyd-based resin so as to form a formulation of the present invention. However, it will be understood from the discussion above that many embodiments of the invention comprise mixing a chelant according to formulae (I), (I-B), (II), (II-B) or (II-C) with a manganese salt or iron salt rather than introduction of the chelant in the form of a preformed, well-defined complex such as those described above. In particular embodiments of the invention, a manganese salt is mixed with a chelant according to formulae (I), (I-B), (II), (II-B) or (II-C).

A formulation of the invention can, and generally will, be used in the manufacture of a fully formulated oxidatively curable coating composition. By the term "fully formulated oxidatively curable coating composition" is implied, as is known to those of skill in the art, oxidatively curable formulations that comprise additional components over and above the binder (the oxidatively curable material, which is predominantly oxidatively curable alkyd resin according to the present invention), an aqueous or non-aqueous solvent/liquid continuous phase and any metal driers intended to accelerate the curing process. Such additional components are generally included so as to confer desirable properties upon the coating composition, such as colour or other visual characteristics such as glossiness or mattness), physical, chemical and even biological stability (enhanced biological stability being conferred upon coating compositions by the use of biocides for example), or modified texture, plasticity, adhesion and viscosity.

For example, such optional additional components may be selected from solvents, antioxidants (sometimes referred to as antiskinning agents), additional siccatives (i.e. not comprising a chelant of formulae (I), (I-B), (II), (II-B) or (II-C)), auxiliary driers, colourants (including inks and coloured pigments), fillers, plasticisers, viscosity modifiers, UV light absorbers, stabilisers, antistatic agents, flame retardants, lubricants, emulsifiers (in particular where an oxidatively curable coating composition or formulation of the invention is aqueous-based), anti-foaming agents, viscosity modifiers, antifouling agents, biocides (e.g. bactericides, fungicides, algaecides and insecticides), anticorrosion agents, antireflective agents, anti-freezing agents, waxes and thickeners. Typically, formulations prepared in accordance with embodiments of the method of the second aspect of the invention will comprise at least an organic solvent, selected from the list of solvents described above, a filler and generally an antiskinning agent, in addition to the alkyd and optionally other binders and chelant present in the formulation of the invention. The skilled person is familiar with the incorporation of these and other components into oxidatively curable coating composition so as to optimise such compositions' properties.

It will be appreciated that some of these optional additional components possess more than one functional property. For example, some fillers may also function as colourants. The nature of any additional components and the amounts used may be determined in accordance with the knowledge of those of skill in the art and will depend on the application for which the curable coating compositions intended. Examples of optional additional components are discussed in the following paragraphs, which are intended to be illustrative, not limitative.

When producing a fully formulated oxidatively curable coating composition that is, for example, a paint, one or more antioxidants (customarily referred to in the art as antiskinning agents) are often included to avoid premature curing of the oxidatively curable coating composition prior to its use. Such premature curing may be manifested by, for example, the formation of a skin on or lumpy matter in the oxidatively curable coating composition as a result of curing during storage, for example hardening of the surface of a paint layer in a can, owing to the activity of the siccative with oxygen on the oxidatively curable binder. Antiskinning agents are understood to reduce skinning by quenching radicals formed and/or by inactivation of drier catalysts by binding to one or more of the coordination sites. Examples include, but are not limited to, methylethylketoxime, acetonoxime, butyraldoxime, methyl-isobutylketoxime, 2-cyclohexylphenol, 4-cyclohexylphenol, t-butyl-hydroquinone, dialkylhydroxylamine, acetylacetonate, ammonia, vitamin E (tocopherol), hydroxylamine, triethylamine, dimethylethanolamine, 2-t-butyl-4-methylphenol, and 2-[(1-methylpropyl)amino]ethanol. According to particular embodiments, the antiskinning agent is selected from the group consisting of methylethylketoxime, acetonoxime, butyraldoxime, dialkylhydroxylamine, ammonia, hydroxylamine, triethylamine, dimethylethanolamine, o-cyclohexylphenol, p-cyclohexylphenol and 2-t-butyl-4-methylphenol.

The quantity of antiskinning agent present in an oxidatively curable coating composition is typically between about 0.001 and about 2.5 wt %. The antioxidant or antiskinning agent may be added to an alkyd-based resin formulation, e.g. of the invention, together with (or separately from) the chelant prior to or during the preparation of a fully formulated oxidatively curable coating composition (for example a paint or other coating composition).

Colourants include pigments and inks. Titanium dioxide is a pigment commonly included in many coating compositions, in particular paints.

Fillers may be added to an oxidatively curable coating composition for a number of reasons, for example to bulk out the coating composition and to compare particular properties on the cured composition. Typically, fillers will be inorganic solids that are generally introduced in particulate (finely divided) form. Examples include silica, silicates or clays (for example mica, talc, kaolin), carbonate or other minerals and metal salts or oxides (such as marble, quartzite). Other suitable fillers will be evident to the skilled person.

It may be advantageous if an alkyd resin manufacturer has determined a particular concentration of metal drier that is appropriate for a particular alkyd-based resin formulation for the manufacturer to recommend to users of the formulation an appropriate source of transition metal ions that may be added in order to generate a desired metal drier in situ.

Moreover, according to the fourth aspect of the invention, there is provided a kit comprising a formulation of the invention comprising less than 0.001% by weight of ions of each of at least manganese, iron, cobalt, vanadium and copper and, separately, a composition comprising a source of suitable transition metal ions, typically ions selected from the group consisting of manganese and iron ions, often in the form of a salt such as those described above, for admixture to a formulation of the invention. The kit may optionally comprise instructions or other guidance as to methods according to which the formulation and the transition metal ions may be contacted. In this way, the manufacture of a formulation of the invention can, after optimising the nature of the source of transition metal ions, for example by the preparation of a particular solution of a particular transition metal ions salt, optimise the manner in which formulations containing transition metal complexes can be prepared. The preparation of an oxidatively curable alkyd-based coating composition may be by the manufacturer of such compositions (e.g. a paint manufacturer) or by an end consumer of oxidatively curable alkyd-based coating compositions, who can contact a source of transition metal ions with an otherwise fully formulated oxidatively curable alkyd-based coating composition.

It is also within the scope of the current invention that a paint manufacturer, for example, would add commercial metal-soap/chelant mixtures, such as the non-limiting example of Borchers® Dry 0410 (a mixture of bpy with Mn(neodecanoate)$_2$ commercially available from OMG). The additional chelant present in the alkyd resin will improve the drying behaviour without causing excessive yellowing which may be occurring if more of the Mn-soap/ligand mixture is added to the paint formulation.

Additionally, one or more auxiliary driers may be added to the fully formulated oxidatively curable coating composition. Such auxiliary driers may be optional additional components within, but are often not present in, the formulation of the invention. Such auxiliary driers include fatty acid soaps of zirconium, bismuth, barium, cerium, calcium, lithium, strontium, and zinc. Typically, fatty acid soaps are optionally substituted octanoates, hexanoates and naphthenates. Without being bound by theory, auxiliary driers (sometimes referred to as through driers) are generally understood to diminish the effect of adsorption of the main drier on solid particles often present in an oxidatively curable coating composition. Other non-metal based auxiliary driers may also be present if desired. These may include, for example, thiol compounds, as described in US 2001/0008932 A1 (Bakkeren et al.) or biomolecules as described in US 2005/0245639 A1 (Oostveen et al.). Concentrations of auxiliary driers within oxidatively curable coating compositions (or formulations of the invention) are typically between about 0.01 wt % and 2.5 wt % as is known in the art.

The formulations of the invention (including the fully formulated oxidatively curable coating compositions described herein) may be used as a decorative coating, e.g. applied to wood substrates, such as door or window frames, or for other substrates such as those made of synthetic materials (such as plastics including elastomeric materials), concrete, leather, textile, glass, ceramic or metal, in accordance with the fifth aspect of the invention. The thus-applied composition may then be allowed to cure. In this respect, the third aspect of the invention is directed towards a formulation according to the first aspect, or obtainable according to the second aspect, when cured.

Each and every patent and non-patent reference referred to herein is hereby incorporated by reference in its entirety, as if the entire contents of each reference were set forth herein in its entirety.

The invention may be further understood with reference to the following non-nonlimiting clauses:

The invention may be further understood with reference to the following non-nonlimiting clauses:

1. A formulation comprising an oxidatively curable alkyd-based curable resin and a chelant, which is of formulae (I) or (I-B):

(I)

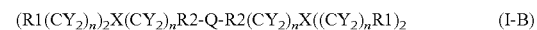

(I-B)

(wherein:
the or each X is N or CZ, wherein Z is selected from hydrogen, optionally $C_{1-6}$alkyl-substituted $C_{1-24}$alkyl, optionally $C_{1-6}$alkyl-substituted $C_{1-24}$alkyl-oxy-$C_{1-24}$alkyl, optionally $C_{1-6}$alkyl-substituted $C_{1-24}$alkyl-oxy-$C_{6-10}$aryl, optionally $C_{1-6}$alkyl-substituted $C_{1-24}$alkyl-O—$C_{6-10}$aryl $C_{1-24}$alkyl, optionally $C_{1-6}$alkyl-substituted hydroxy $C_{1-24}$alkyl, optionally $C_{1-6}$alkyl-substituted $C_{6-10}$aryl and optionally $C_{1-6}$alkyl-substituted $C_{6-10}$aryl$C_{1-24}$alkyl;

n is 0 if X=CZ and 1 if X=N;

each Y is independently selected from H, $CH_3$, $C_2H_5$ and $C_3H_7$;

each —R1 is independently selected from —$CY_2N(C_{1-24}alkyl)_2$; —$CY_2NR3$, in which R3 and the nitrogen atom N to which it is attached represent a heterocycloalkyl group optionally substituted with one or more $C_{1-6}$alkyl groups, which is connected to the adjacent $CY_2$ moiety through the nitrogen atom N; or represents an optionally $C_{1-6}$alkyl-substituted heteroaryl group selected from pyridin-2-yl, pyrazin-2-yl, quinolin-2-yl, pyrazol-1-yl, pyrazol-3-yl, pyrrol-2-yl, imidazol-2-yl, imidazol-4-yl, benzimidazol-2-yl, pyrimidin-2-yl, 1,2,3-triazol-1-yl, 1,2,3-triazol-2-yl, 1,2,3-triazol-4-yl, 1,2,4-triazol-1-yl, 1,2,4-triazol-3-yl and thiazol-2-yl;

both —R2- moieties, if present, are independently selected from an optionally $C_{1-6}$alkyl-substituted heteroarylene group selected from pyridin-2,6-diyl, pyrazin-2,6-diyl, quinolin-2,8-diyl, pyrazol-1,3-diyl, pyrrol-2,5-diyl, imidazol-1,4-diyl, imidazol-2,5-diyl, pyrimidin-2,6-diyl, 1,2,3-triazol-2,5-diyl, 1,2,4-triazol-1,3-diyl, 1,2,4-triazol-3,5-diyl and thiazol-2,4-diyl;

Q represents a bridge selected from the group consisting of a $C_{1-6}$alkylene moiety, a $C_{6-10}$arylene moiety or a moiety comprising one or two $C_{1-3}$alkylene units and one $C_{6-10}$arylene unit, which bridge is optionally substituted one or more times with independently selected $C_{1-24}$alkyl groups and OH groups);

or is of formulae (II), (II-B) or (II-C):

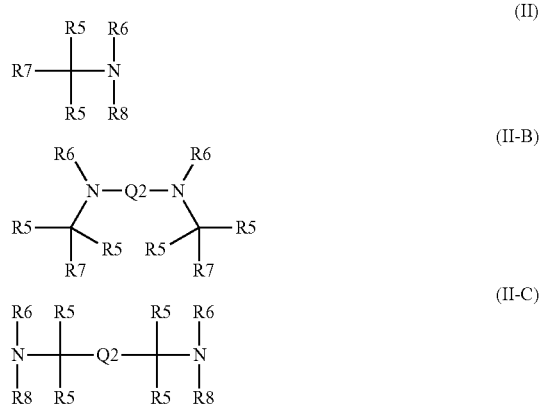

(wherein:
each —R5 independently is selected from —$CH_2N(C_{1-24}alkyl)_2$, —$CH_2NR9$ or an optionally $C_{1-6}$alkyl-substituted heteroaryl group selected from pyridin-2-yl, pyrazin-2-yl, quinolin-2-yl, pyrazol-1-yl, pyrazol-3-yl, pyrrol-2-yl, imidazol-2-yl, imidazol-4-yl, benzimidazol-2-yl, pyrimidin-2-yl, 1,2,3-triazol-1-yl, 1,2,3-triazol-2-yl, 1,2,3-triazol-4-yl, 1,2,4-triazol-1-yl, 1,2,4-triazol-3-yl and thiazol-2-yl);

the or each —R6 independently represents —R10-R11;

the or each —R7 and the or each —R8 each independently represents hydrogen, or a group selected from $C_{1-18}$alkyl, $C_{6-10}$aryl, $C_{5-10}$heteroaryl, $C_{6-10}$aryl$C_{1-6}$alkyl and $C_{5-10}$heteroaryl$C_{1-6}$alkyl, each of which groups may be optionally $C_{1-6}$alkyl-substituted, with the proviso that no —R7 or —R8 may be one of the possibilities permitted for —R5;

the or each —R10- independently represents optionally $C_{1-6}$alkyl-substituted $C_{1-6}$alkylene;

the or each —R11 independently represents hydrogen, $C_{1-6}$alkyl, optionally $C_{1-6}$alkyl-substituted $C_{6-10}$aryl, optionally $C_{1-6}$alkyl-substituted $C_{5-10}$heteroaryl, optionally $C_{1-6}$alkyl-substituted $C_{5-10}$heteroaryl$C_{1-6}$alkyl, $CY_2N(C_{1-24}alkyl)_2$ group or $CY_2NR9$;

each —NR9 independently represents a moiety in which R9 and the nitrogen atom N to which it is attached represent a heterocycloalkyl group optionally substituted with one or more $C_{1-20}$alkyl groups, which is connected to the remainder of the chelant through the nitrogen atom N; and Q2 represents a bridge selected from the group consisting of a $C_{1-6}$alkylene moiety $C_{6-10}$arylene moiety or a moiety comprising one or two $C_{1-3}$alkylene units and one $C_{6-10}$arylene unit, which bridge is optionally substituted one or more times with independently selected $C_{1-24}$alkyl groups and OH groups).

2. The formulation of clause 1, wherein the chelant is of formula (I), (I-B), (II) or (II-B).

3. The formulation of clause 1, wherein the chelant is of formula (I) or (II).

4. The formulation of any one of clauses 1 to 3, wherein each Y, if present, is H.

5. The formulation of any one of clauses 1 to 4, wherein the or each X is N or CZ in which Z is selected from hydrogen, optionally $C_{1-6}$alkyl-substituted $C_{1-24}$alkyl, optionally $C_{1-6}$alkyl-substituted $C_{1-24}$alkyl-O—$C_{1-24}$alkyl, optionally $C_{1-6}$alkyl-substituted hydroxy$C_{1-24}$alkyl, and optionally $C_{1-6}$alkyl-substituted $C_{6-10}$aryl$C_{1-24}$alkyl.

6. The formulation of clause 5, wherein Z is hydrogen, $C_{1-24}$alkyl or $C_{6-10}$aryl$C_{1-24}$alkyl.

7. The formulation of clause 6, wherein the or each X is N or CZ in which Z is hydrogen, $C_{1-18}$alkyl or $C_{6-10}$arylmethyl.

8. The formulation of clause 5, wherein the or each X is N or CZ wherein Z is selected from H, methyl, hydroxymethyl, methoxymethyl and benzyl.

9. The formulation of any one of clauses 1 to 4, wherein the or each X is N.

10. The formulation of any one of clauses 1 to 9, wherein Q is selected from —$CH_2$—, —$CH_2CH_2$—, —$CH_2CH_2CH_2$—, —$CH_2CHOHCH_2$—, 1,2-phenylene and 1,4-phenylene, each of which is optionally $C_{1-6}$alkyl-substituted.

11. The formulation of any one of clauses 1 to 10, wherein Q is unsubstituted.

12. The formulation of any one of clauses 1 to 11, wherein both —R2- moieties are the same.

13. The formulation of clause 12, wherein both —R2- moieties are pyridin-2,6-diyl, imidazol-1,4-diyl or imidazol-2,5-diyl.

14. The formulation of clause 12 or clause 13, wherein both —R2- moieties are pyridin-2,6-diyl.

15. The formulation of any one of clauses 1 to 14, wherein each of the —R1 moieties is either —$CY_2N(C_{1-24}alkyl)_2$ or —$CY_2NR3$, the nitrogen-containing group attached to the $CY_2$ group recited being selected from the group consisting of —$NMe_2$, —$NEt_2$, —$N(i-Pr)_2$,

16. The formulation of clause 15, wherein each of the —R1 moieties is either —CH$_2$N(C$_{1-24}$alkyl)$_2$ or —CH$_2$NR3.

17. The formulation of any one of clauses 1 to 14, wherein each —R1 is pyridin-2-yl, imidazol-2-yl, imidazol-4-yl, benzimidazol-2-yl, each of which is optionally substituted with one or more C$_{1-6}$alkyl groups.

18. The formulation of clause 17, wherein each —R1 is optionally substituted pyridin-2-yl.

19. The formulation of clause 18, wherein each —R1 is unsubstituted pyridin-2-yl.

20. The formulation of any one of clauses 1 to 19, wherein each —R5 is optionally substituted pyridin-2-yl.

21. The formulation of clause 20, wherein each —R5 is unsubstituted pyridin-2-yl.

22. The formulation of any one of clauses 1 to 19, wherein each of the —R5 moieties is either —CY$_2$N(C$_{1-24}$alkyl)$_2$ or —CY$_2$NR3, the nitrogen-containing group attached to the CY$_2$ group recited being selected from the group consisting of —NMe$_2$, —NEt$_2$, —N(i-Pr)$_2$,

23. The formulation of clause 22, wherein each of the —R5 moieties is either —CH$_2$N(C$_{1-24}$alkyl)$_2$ or —CH$_2$NR3.

24. The formulation of any one of clauses 1 to 23, wherein the or each —R10- is —CH$_2$—.

25. The formulation of any one of clauses 1 to 24, wherein the or each —R11 independently represents C$_{5-10}$heteroaryl, C$_{5-10}$heteroarylC$_{1-6}$alkyl, —CY$_2$N(C$_{1-24}$alkyl)$_2$ or —CY$_2$NR9.

26. The formulation of any one of clauses 1 to 24, wherein the or each —R11 is selected from —H, C$_{1-5}$alkyl, phenyl, —CY$_2$N(C$_{1-24}$alkyl)$_2$, —CY$_2$NR9 or an optionally C$_{1-6}$alkyl-substituted heteroaryl group selected from the group consisting of pyridin-2-yl, pyrazin-2-yl, quinolin-2-yl, pyrazol-1-yl, pyrazol-3-yl, pyrrol-2-yl, imidazol-2-yl, imidazol-4-yl, benzimidazol-2-yl, pyrimidin-2-yl, 1,2,3-triazol-1-yl, 1,2,3-triazol-2-yl, 1,2,3-triazol-4-yl, 1,2,4-triazol-1-yl, 1,2,4-triazol-3-yl and thiazol-2-yl.

27. The formulation of any one of clauses 1 to 24, wherein the or each —R11 is selected from —H, phenyl, —CY$_2$N(C$_{1-8}$alkyl)$_2$ or —CY$_2$NR9, in which R9 and the nitrogen atom N to which it is attached represent an unsubstituted heterocycloalkyl group, which is connected to the remainder of the chelant through the nitrogen atom N.

28. The formulation of clause 27, wherein the or each of the —R11 moieties is either —CY$_2$N(C$_{1-24}$alkyl)$_2$ or —CY$_2$NR9, the nitrogen-containing group attached to the CY$_2$ group recited being selected from the group consisting of —NMe$_2$, —NEt$_2$, —N(i-Pr)$_2$,

29. The formulation of clause 28, wherein the or each of the —R11 moieties is either —CH$_2$N(C$_{1-24}$alkyl)$_2$ or —CH$_2$NR9.

30. The formulation of any one of clauses 1 to 24 wherein the or each R11 is an optionally alkyl-substituted heteroaryl group.

31. The formulation of clause 30, wherein the or each R11 is optionally substituted pyridin-2-yl, imidazol-2-yl, imidazol-4-yl or benzimidazol-2-yl.

32. The formulation of clause 31, wherein the or each R11 is optionally substituted pyridin-2-yl.

33. The formulation of clause 32, wherein the or each R11 is unsubstituted pyridin-2-yl.

34. The formulation of any one of clauses 1 to 33, wherein the or each —R7 and the or each —R8 independently represents —H, or a group selected from C$_{1-6}$alkyl, C$_{6-10}$aryl and C$_{6-10}$arylC$_{1-6}$alkyl, each of which groups may be optionally C$_{1-6}$alkyl-substituted.

35. The formulation of clause 34, wherein the or each —R7 is selected from —H, methyl and benzyl.

36. The formulation of clause 34 or clause 35 wherein the or each —R8 is selected from —H, methyl, and benzyl.

37. The formulation of clause 36, wherein the or each —R8 is methyl.

38. The formulation of any one of clauses 1 to 37, wherein bridge Q2 is selected from —CH$_2$—, —CH$_2$CH$_2$—, —CH$_2$CH$_2$CH$_2$—, —CH$_2$CHOHCH$_2$—, 1,2-phenylene and 1,4-phenylene, each of which is optionally C$_{1-6}$alkyl-substituted.

39. The formulation of any one of clauses 1 to 38, wherein bridge Q2 is unsubstituted.

40. The formulation of clause 39, wherein bridge Q2 is —CH$_2$CH$_2$—.

41. The formulation of any one of clauses 1 to 3, wherein:
the or each X is N or CZ wherein Z is selected from H, methyl, hydroxymethyl, methoxymethyl and benzyl;
each Y, if present, is H;
each —R1 is pyridin-2-yl, imidazol-2-yl, imidazol-4-yl, benzimidazol-2-yl, each of which is optionally substituted with one or more C$_{1-6}$alkyl groups;
both —R2- moieties, if present, are pyridin-2,6-diyl, imidazol-1,4-diyl or imidazol-2,5-diyl;
each R5 is optionally substituted pyridin-2-yl;
the or each —R7 is selected from —H, methyl and benzyl;
the or each —R8 is selected from —H, C$_{1-18}$alkyl and benzyl;
the or each —R10- is —CH$_2$—;
the or each R11 is optionally substituted pyridin-2-yl, imidazol-2-yl, imidazol-4-yl or benzimidazol-2-yl, for example unsubstituted pyridin-2-yl; and
each Q and Q2, if present, is selected from —CH$_2$—, —CH$_2$CH$_2$—, —CH$_2$CH$_2$CH$_2$—, —CH$_2$CHOHCH$_2$—, 1,2-phenylene and 1,4-phenylene, each of which is optionally C$_{1-6}$alkyl-substituted, for example each Q and Q2, if present is —CH$_2$CH$_2$—.

42. The formulation of any one of clauses 1 to 41, wherein the chelant is capable of chelating at least one transition metal ion through four donor nitrogen atoms.

43. The formulation of clause 1, wherein the chelant is N,N,N-tris(pyridin-2-yl-methyl)amine, tris(pyridin-2-yl)methane or tris(6-methyl-pyridin-2-yl)methane.

44. The formulation of clause 1, wherein the chelant is N-methyl-N-(pyridin-2-yl-methyl)-bis(pyridin-2-yl)methylamine, N-benzyl-N-(pyridin-2-yl-methyl)-bis(pyridin-2-yl) methylamine, N,N-dimethyl-bis(pyridin-2-yl)methylamine, N-methyl-N-(pyridin-2-yl-methyl-1,1-bis(pyridin-2-yl)-1-aminoethane, N-benzyl-N-(pyridin-2-yl-methyl-1,1-bis(pyridin-2-yl)-1-aminoethane, N-methyl-N-(pyridin-2-yl-methyl-1,1-bis(pyridin-2-yl)-2-phenyl-1-aminoethane or N-benzyl-N-(pyridin-2-yl-methyl-1,1-bis(pyridin-2-yl)-2-phenyl-1-aminoethane.

45. The formulation of clause 1, wherein the chelant is N,N,N-tris(pyridin-2-yl-methyl)amine, tris(pyridin-2-yl)methane, N-methyl-N-(pyridin-2-yl-methyl)-bis(pyridin-2-yl)methylamine or N-benzyl-N-(pyridin-2-yl-methyl)-bis(pyridin-2-yl)methylamine.

46. The formulation of any one of clauses 1 to 45, wherein the chelant is present in the formulation at a concentration of between about 0.00005 and about 0.5 wt % with respect to curable resin.

47. The formulation of any one of clauses 1 to 46, wherein the chelant is present in the formulation at a concentration of between about 0.0001 and about 0.1 wt % with respect to curable resin.

48. The formulation of any one of clauses 1 to 47, which is a solvent-based formulation.

49. The formulation of any one of clauses 1 to 48, further comprising an antiskinning agent.

50. The formulation of clause 49, wherein the antiskinning agent is selected from the group consisting of methylethylketoxime, acetonoxime, butyraldoxime, dialkylhydroxylamine, ammonia, hydroxylamine, triethylamine, dimethylethanolamine, o-cyclohexylphenol, p-cyclohexylphenol and 2-t-butyl-4-methylphenol.

51. The formulation of any one of clauses 1 to 50, which comprises a complex comprising the chelant and a transition metal ion selected from the group consisting of ions of manganese, iron, vanadium and copper.

52. The formulation of clause 51, which comprises a complex comprising the chelant and a transition metal ion selected from the group consisting of ions of manganese and iron.

53. The formulation of clause 51 or clause 52, wherein the complex is not well-defined.

54. The formulation of any one of clauses 51 to 53, which comprises a complex comprising the chelant and a manganese ion.

55. The formulation of any one of clauses 1 to 50, which formulation comprises less than 0.001% by weight of ions of each of manganese, iron, cobalt, vanadium and copper.

56. A method of preparing a formulation as defined in any one of clauses 1 to 55, the method comprising contacting a composition comprising the alkyd-based resin with a composition comprising the chelant.

57. The method of clause 56 wherein the formulation is as defined in clause 55.

58. The method of clause 57 further comprising contacting the formulation with a source of transition metal ions.

59. The method of clause 58, wherein the transition metal ions are manganese, iron, vanadium or copper ions.

60. The method of any clause 58 or clause 59 wherein a solution of the transition metal ions is contacted with the formulation.

61. The method of any one of clauses 58 to 60, wherein the transition metal ions are manganese or iron ions.

62. The method of clause 61, wherein the formulation is contacted with an optionally hydrated salt selected from the group consisting of $MnCl_2$, $FeCl_2$, $FeCl_3$, $MnBr_2$, $Mn(NO_3)_2$, $Fe(NO_3)_3$, $MnSO_4$, $FeSO_4$, $(Fe)_2(SO_4)_3$, Mn(acetylacetonate)$_2$, Fe(acetylacetonate)$_2$, Mn(acetylacetonate)$_3$, Fe(acetylacetonate)$_3$, $Mn(R_4COO)_3$, $Fe(R_4COO)_3$, $Mn(R_4COO)_2$ and $Fe(R_4COO)_2$, wherein each $R_4$ is a $C_1$-$C_{24}$ alkyl.

63. The method of clause 61 or clause 62, wherein the transition metal ions are manganese ions.

64. The method of clause 63, wherein the formulation is contacted with an optionally hydrated salt selected from the group consisting of $MnSO_4$, $MnCl_2$, $MnBr_2$, $Mn(NO_3)_2$, $Mn(CH_3COO)_3$, $Mn(CH_3COO)_2$, Mn(acetylacetonate)$_2$, Mn(acetylacetonate)$_3$, Mn(octanonate)$_2$, Mn(2-ethylhexanoate)$_2$, Mn(naphthenate)$_2$ and Mn(neodecanoate)$_2$.

65. The method of clause 56, wherein the composition comprising the chelant comprises a complex as defined in clause 53.

66. The method of clause 65, wherein the composition comprising the complex comprises a mixture of the chelant and a salt of the transition metal ion.

67. The method of clause 66, wherein the salt is as defined in any one of clauses 61 to 64.

68. The formulation of clause 53, which is obtainable by a method as defined in any one of clauses 58 to 67.

69. A composition resultant from curing of a formulation as defined in any one of clauses 51 to 54 or 68.

70. A kit comprising a formulation as defined in clause 55 and, separately, a composition comprising transition metal ions selected from the group consisting of manganese, iron, vanadium and copper ions.

71. The kit of clause 70, wherein the transition metal ions are manganese or iron ions 72. The kit of clause 71, wherein the ions are provided as a salt as defined in clause 62 or clause 63.

73. The kit of clause 71 or clause 72, wherein the transition metal ions are manganese ions.

74. A method comprising applying to a substrate a formulation as defined in any one of clauses 51 to 54 and 68.

The non-limiting examples below more fully illustrate the embodiments of this invention.

EXPERIMENTAL

The ligand N,N,N-tris(pyridin-2-ylmethyl)amine as perchloric acid salt (TPA.3HClO$_4$) was prepared as disclosed elsewhere (G. Anderegg and F. Wenk, Helv. Chim. Acta, 50, 2330-2332 (1967) and B. G. Gafford et al., (Inorg. Chem., 28, 60-66 1989)). N-methyl-N-(pyridin-2-yl-methyl)-bis(pyridin-2-yl)methylamine (CH$_3$N3py) was obtained as disclosed by M. Klopstra et al. (Eur. J. Inorg. Chem., 4, 846-856 (2006)). 1,1,1-tris(pyridin-2-ylmethyl)methane (TPM) was prepared as published by R. Clavreul, B. Bloch (Macromol. Chem., 47, 118, (1987)). 1,2-bis[2-bis(6-methyl-2-pyridyl)methyl-6-pyridyl]ethane (L) has been prepared as described by M Kodera, et al. (J. Am. Chem. Soc., 121, 11006 (1999)).

Compound (1): [Mn$_2$(μ-O)$_2$(TPA)$_2$](S$_2$O$_6$)$_{32}$ (TPA=tris(pyridin-2-ylmethyl)amine) was prepared as described by D. J. Hodgson et al. (Inorg. Chim. Acta, 141, 167-188 (1988)).

Compound (2): [Mn(N2py2)Cl$_2$] (N2py2=2,4-di-(2-pyridyl)-3,7-dimethyl-3,7-diaza-bicyclo[3.3.1]nonan-9-one-1,5-dicarboxylate) was prepared by P. Comba et al. (J. Chem. Soc., Dalton Trans., 3997-4001 (1998)).

Compound (3): [Fe(N2py2)C$_2$] was prepared as published by P. Comba et al. (Inorg. Chim. Acta, 337, 407-419 (2002)).

Alkyd resin (catalogue number A/1552/15; an alkyd resin solution of 70 wt % in white spirits) was obtained from Acros Organics. Manganese (11) 2-ethylhexanoate (abbreviated as Mn(2-EH)$_2$ below; catalogue number 93-2532; 40% solution in mineral spirits, 6 wt % Mn) was obtained from Strem Chemicals. Manganese(II) acetate tetrahydrate was obtained from Aldrich. Manganese chloride tetrahydrate and iron chloride tetrahydrate were obtained from Fluka. Iron sulfate heptahydrate and potassium hydroxide were obtained from Merck. A commercial batch of iron naphthenate, 40% in mineral spirits, 6% iron, ex Strem Chemicals Inc. has been used. This sample will be abbreviated as Fe(napht)$_2$ in the section below. Cobalt Hex-Cem (12% cobalt) was obtained from OMG.

In general, the drier was added to the resin 1 day before application on a glass plate. The layer thickness was 37 μm (using a Cube film applicator). The dryness of the resin was determined using a B.K. drying recorder model no 3.

Two stages of the drying process are given:
Surface dry: The needle still penetrates the resin film, but leaves an interrupted track.
Through dry: The needle no longer penetrates the film.

Experiment 1a: Mn(2-EH)$_2$ and TPA Ligand Mixed (1:1), then Added to Resin 3.23 mg TPA was homogeneously suspended in 50 μL ethanol. 0.92 mg potassium hydroxide dissolved in 50 μL ethanol was added. To this, 5 mg Mn(2-EH)$_2$ dissolved in 50 μL heptane was added. This mixture was left for 15 minutes whereafter 3 g of alkyd resin was added. The mixture was stirred manually for ca. 1 minute and was stored in a closed vial overnight at room temperature. The Mn level was 0.01 wt % with respect to the resin solution (0.014 wt % with respect to the solid resin) and a 1:1 molar ratio Mn:TPA. The resin solution was applied on a glass plate with a layer thickness of 37 μm. The drying process was followed using a drying recorder. A surface dry time of 1 h, and a through dry time of 1.5 h were obtained.

Experiment 1 b: Mn(Acetate)$_2$ and TPA Ligand Mixed (1:1), then Added to Resin

Experiment 1a was repeated, except that manganese (II) acetate tetrahydrate was used instead of Mn(2-EH)$_2$. 1.34 mg manganese (II) acetate tetrahydrate was dissolved in 50 μL ethanol and added to the resin solution. A surface dry time of 1 h, and a through dry time of 1.5 h were obtained.

Experiment 1c: MnCl$_2$ and TPA Ligand Mixed (1:1), then Added to Resin

Experiment 1a was repeated, except that manganese chloride tetrahydrate was used instead of Mn(2-EH)$_2$. 1.08 mg manganese chloride tetrahydrate was dissolved in 50 μL ethanol and added to the resin solution. A surface dry time of 1.25 h, and a through dry time of 1.75 h were obtained.

Experiment 1d

Mn(2-EH)$_2$ and TPA ligand mixed (1:1), then added to the resin (Mn level:0.005%)
Experiment 1a was repeated, except that the concentrations of TPA, potassium hydroxide and Mn(2-EH)$_2$ were halved. 1.62 mg TPA was homogeneously suspended in 50 μL ethanol. 0.46 mg potassium hydroxide dissolved in 25 μL ethanol was added. To this, 2.5 mg Mn(2-EH)$_2$ dissolved in 25 μL heptane was added. The Mn level was 0.005 wt % with respect to the resin solution (0.007 wt % with respect to the solid resin) and a 1:1 molar ratio Mn:TPA. A surface dry time of 1.75 h, and a through dry time of 2 h were obtained.

Experiment 1e

Mn(2-EH)$_2$ and TPA Ligand Mixed (1:2), then Added to the Resin (Mn Level:0.005%)
Experiment 1a was repeated, except that the concentration of Mn(2-EH)$_2$ was halved, whilst that of TPA remained the same (yielding a molar ratio of Mn to TPA of 1:2). To the TPA-potassium hydroxide mixture, 2.5 mg Mn(2-EH)$_2$ dissolved in 25 μL heptane was added. The Mn level was 0.005 wt % with respect to the resin solution (0.007 wt % with respect to the solid resin) and a 1:2 molar ratio Mn:TPA. A surface dry time of 1.25 h, and a through dry time of 1.75 h were obtained.

Experiment 1f: Mn(2-EH)$_2$ and TPA Ligand 1:1 (TPA Premixed with the Resin)

Experiment 1a was repeated, except that the TPA and potassium hydroxide were added to the resin one day before the Mn(2-EH)$_2$. On day 1 3.23 mg TPA was homogeneously suspended in 50 μL ethanol and 0.92 mg potassium hydroxide dissolved in 50 μL ethanol was added. To this, 3 g of the resin was added and manually stirred for ca. 1 minute. On day 2 5 mg Mn(2-EH)$_2$ dissolved in 50 μL heptane was added and stirred through manually for ca. 1 minute. On day 3 the drying times were determined. A surface dry time of 1.0 h, and a through dry time of 1.5 h were obtained.

Experiment 1g: Mn(2-EH)$_2$ and TPA Ligand Mixed (1:1)

1.59 mg TPA (non-protonated, ex PIChemicals) was dissolved in 50 μL acetonitrile. To this, 5 mg Mn(2-EH)$_2$ dissolved in 50 μL heptane was added, followed by 3 g of alkyd resin. The mixture was stirred manually for ca. 1 minute and was stored in a closed vial overnight at room temperature. The Mn level was 0.01 wt % with respect to the resin solution (0.014 wt % with respect to the solid resin) and a 1:1 molar ratio Mn:TPA. The resin solution was applied on a glass plate with a layer thickness of 37 μm. The drying process was followed using a drying recorder. A surface dry time of 0.9 h, and a through dry time of 1.5 h were obtained.

Experiment 2a: Fe(Napht)$_2$ and TPA Ligand Mixed (1:1), then Add to Resin 3.18 mg TPA was homogeneously suspended in 50 μL ethanol. 0.92 mg potassium hydroxide dissolved in 50 μL ethanol was added. To this, 5 mg Fe(napht)$_2$ dissolved in 50 μL heptane was added. This mixture was left for 15 minutes whereafter 3 g of alkyd resin was added. The mixture was stirred manually for ca. 1 minute and was stored in a closed vial overnight at room temperature. The Fe level was 0.01 wt % with respect to the resin solution (0.014 wt % with respect to the solid resin) and a 1:1 molar ratio Fe:TPA. The resin solution was applied on a glass plate with a layer thickness of 37 μm. The drying process was followed using a drying recorder. A surface dry time of 2 h, and a through dry time of 3.75 h were obtained.

Experiment 2b: FeCl$_2$ and TPA Ligand Mixed (1:1), then Add to Resin

Experiment 2a was repeated, except that iron (II) chloride tetrahydrate was used instead of Fe(napht)$_2$. 1.07 mg iron (II) chloride tetrahydrate was homogeneously suspended in 50 μL ethanol and added to the resin solution. A surface dry time of 2.75 h, and a through dry time of 4.25 h were obtained.

Experiment 2c: FeSO$_4$ and TPA Ligand Mixed (1:1), then Add to Resin

Experiment 2a was repeated, except that iron sulfate heptahydrate was used instead of Fe(napht)$_2$. 1.49 mg iron sulfate heptahydrate was homogeneously suspended in 50 μL ethanol and added to the resin solution. A surface dry time of 2.5 h, and a through dry time of 5.25 h were obtained.

Experiment 2d: Fe(Napht)$_2$ and TPA Ligand (1:1)—TPA Ligand Premixed with Resin Experiment 2a was repeated, except that the TPA and potassium hydroxide were added to the resin one day before the Fe(napht)$_2$. On day 1 3.18 mg TPA was homogeneously suspended in 50 μL ethanol and 0.92 mg potassium hydroxide dissolved in 50 μL ethanol was added. To this, 3 g of the resin was added and manually stirred for ca. 1 minute. On day 2 5 mg Fe(napht)$_2$ dissolved in 50 μL heptane was added and stirred through manually for ca. 1 minute. On day 3 the drying times were determined. A surface dry time of 2.25 h, and a through dry time of 5.25 h were obtained.

Experiment 3a: Mn-TPA Complex (1)

Experiment 1a was repeated except now a well-defined Mn-TPA complex (1) was added to the resin solution instead of the Mn(2-EH)$_2$, KOH and TPA ligand. 2.63 mg Mn-TPA complex was dissolved in 200 μL water and added to the resin solution. The Mn level was 0.01 wt % with respect to the resin solution (0.014 wt % with respect to the solid resin). A surface dry time of 1.25 h, and a through dry time of 2.75 h were obtained.

Experiment 4a: Mn(2-EH)$_2$ and CH$_3$N$_3$py Ligand Mixed (1:1), then Added to Resin 1.59 mg CH$_3$N$_3$py was dissolved in 50 μL ethanol. To this, 5 mg Mn(2-EH)$_2$ dissolved in 50 μL heptane was added. This mixture was left for 15 minutes whereafter 3 g of alkyd resin was added. The mixture was stirred manually for ca. 1 minute and was stored in a closed vial overnight at room temperature. The Mn level was 0.01 wt % with respect to the resin solution (0.014 wt % with respect to the solid resin) and a 1:1 molar ratio Mn:CH$_3$N$_3$py. The resin solution was applied on a glass plate with a layer thickness of 37 μm. The drying process was followed using a drying recorder. A surface dry time of 1 h, and a through dry time of 2 h were obtained.

Experiment 4b: Mn(Acetate)$_2$ and CH$_3$N$_3$py Ligand Mixed (1:1), then Added to Resin Experiment 4a was repeated, except that manganese (II) acetate tetrahydrate was used instead of Mn(2-EH)$_2$. 1.34 mg manganese (II) acetate tetrahydrate was dissolved in 50 μL ethanol and added to the resin solution. A surface dry time of 2.5 h, and a through dry time of 2.75 h were obtained.

Experiment 4c: MnCl$_2$ and CH$_3$N$_3$py Ligand Mixed (1:1), then Added to Resin Experiment 4a was repeated, except that manganese chloride tetrahydrate was used instead of Mn(2-EH)$_2$. 1.08 mg manganese chloride tetrahydrate was dissolved in 50 μL ethanol and added to the resin solution. Additionally, 0.92 mg potassium hydroxide dissolved in 50 μL ethanol was added. A surface dry time of 0.75 h, and a through dry time of 1 h were obtained.

Experiment 4d: Mn(2-EH)$_2$ & CH$_3$N$_3$py Ligand (1:1)—(CH$_3$N$_3$py Premixed with Resin)

Experiment 4a was repeated, except that the CH$_3$N$_3$py was added one day before the Mn(2-EH)$_2$. On day 1 1.59 mg CH$_3$N$_3$py was dissolved in 50 μL ethanol. To this, 3 g of the resin solution was added and manually stirred for ca. 1 minute. On day 5 mg Mn(2-EH)$_2$ dissolved in 50 μL heptane was added and stirred through manually for ca. 1 minute. On day 3 the drying times were determined. A surface dry time of 0.75 h, and a through dry time of 1.5 h were obtained.

Experiment 5a: Fe(Napht)$_2$ and CH$_3$N$_3$py 1:1 Mixed, then Add to Resin 1.56 mg CH$_3$N$_3$py was dissolved in 50 μL ethanol. To this, 5 mg Fe(napht)$_2$ dissolved in 50 μL heptane was added. This mixture was left for 15 minutes whereafter 3 g of alkyd resin was added. The mixture was stirred manually for ca. 1 minute and was stored in a closed vial overnight at room temperature. The Fe level was 0.01 wt % with respect to the resin solution (0.014 wt % with respect to the solid resin) and a 1:1 molar ratio Fe:CH$_3$N$_3$py. The resin solution was applied on a glass plate with a layer thickness of 37 μm. The drying process was followed using a drying recorder. A surface dry time of 2.75 h, and a through dry time of 4.25 h were obtained.

Experiment 5b: FeCl$_2$ and CH$_3$N$_3$py Ligand Mixed (1:1), then Added to Resin Experiment 5a was repeated, except that iron (II) chloride tetrahydrate was used instead of Fe(napht)$_2$. 1.07 mg iron (II) chloride tetrahydrate was homogeneously suspended in 50 μL ethanol and added to the resin solution. A surface dry time of 2 h, and a through dry time of 3 h were obtained.

Experiment 5c: FeSO$_4$ and CH$_3$N$_3$py Ligand Mixed (1:1), then Added to Resin Experiment 5a was repeated, except that iron sulfate heptahydrate was used instead of Fe(napht)$_2$. 1.49 mg iron sulfate heptahydrate was homogeneously suspended in 50 μL ethanol and added to the resin solution. A surface dry time of 2.25 h, and a through dry time of 3.5 h were obtained.

Experiment 5d: Fe(Napht)$_2$ and CH$_3$N$_3$py Ligand Mixed (1:2), then Added to Resin Experiment 5a was repeated, except the level of CH$_3$N$_3$py was doubled. 3.12 mg CH$_3$N$_3$py was dissolved in 50 μL ethanol. To this, the Fe(napht)$_2$ and resin solution were added. The Fe level was 0.01 wt % with respect to the resin solution (0.014 wt % with respect to the solid resin) and a 1:2 molar ratio Fe:CH$_3$N$_3$py. A surface dry time of 2 h, and a through dry time of 4 h were obtained.

Experiment 5e: Fe(Napht)$_2$ & CH$_3$N$_3$py Ligand (1:1)—CH$_3$N$_3$Py Premixed with Resin Experiment 5a was repeated, except that the CH$_3$N$_3$py was added one day before the Fe(napht)$_2$. On day 1 1.56 mg CH$_3$N$_3$py was dissolved in 50 μL ethanol. To this, 3 g of the resin solution was added and manually stirred for ca. 1 minute. On day 2, 5 mg Fe(napht)$_2$ dissolved in 50 μL heptane was added and stirred through manually for ca. 1 minute. On day 3 the drying times were determined. A surface dry time of 2.75 h, and a through dry time of 5.25 h were obtained.

Experiment 6: Mn(2-EH)$_2$ and TPM Ligand Mixed (1:1), then Added to Resin 1.58 mg TPM was dissolved in 50 μL ethanol. To this, 5 mg Mn(2-EH)$_2$ dissolved in 50 μL heptane was added. This mixture was left for 15 minutes whereafter 3 g of alkyd resin was added. The mixture was stirred manually for ca. 1 minute and was stored in a closed vial overnight at room temperature. The Mn level was 0.01 wt % with respect to the resin solution (0.014 wt % with respect to the solid resin) and a 1:1 molar ratio Mn:TPM. The resin solution was applied on a glass plate with a layer thickness of 37 μm. The drying process was followed using a drying recorder. A surface dry time of 0.75 h, and a through dry time of 2.5 h were obtained.

Experiment 7: Mn(2-EH)$_2$ and 1,2-(bis((2-bis(pyridin-2-yl)methyl)-6-methyl-pyridinyl)ethane (L) mixed (1:1), then Added to Resin 2.77 mg of L was dissolved in 50 μL ethanol. To this, 5 mg Mn(2-EH)$_2$ dissolved in 50 μL heptane was added. This mixture was left for 15 minutes whereafter 3 g of alkyd resin was added. The mixture was stirred manually for ca. 1 minute and was stored in a closed vial overnight at room temperature. The Mn level was 0.01 wt % with respect to the resin solution (0.014 wt % with respect to the solid resin) and a 1:1 molar ratio Mn:L. The resin solution was applied on a glass plate with a layer thickness of 37 μm. The drying process was followed using a drying recorder. A surface dry time of 3.5 h, and a through dry time of 4 h were obtained.

Comparative Experiment 8

Experiment 4a was repeated, except that now 5 mg of Mn(2-EH)$_2$ without additional ligand was used. The Mn level was 0.01 wt % with respect to the resin solution (yielding a Mn level of 0.014 wt % with respect to the solid resin). No drying was observed within 12 h.

Comparative Experiment 9

Experiment 5a was repeated, except that now 5 mg of Fe(napht)$_2$ without additional ligand was used. The Fe level was 0.01 wt % with respect to the resin solution (yielding a Fe level of 0.014 wt % with respect to the solid resin). No drying was observed within 12 h.

Comparative Experiment 10

Experiment 1a was repeated, except now cobalt soap was added (with a level of cobalt being 0.01 wt % with respect to the resin solution (0.014 wt % with respect to the solid resin)). 2.5 mg Cobalt Hex-Cem was dissolved in 50 μL heptane and resin was added to 3 g of alkyd resin. The drying process was followed using a drying recorder. A surface dry time of 8.5 h, and a through dry time of 9 h were obtained.

Comparative Experiment 11 [Mn(N$_2$Py$_2$)Cl$_2$] (2)

3.08 mg of (2) was dissolved in 50 μL water and added to 3 g alkyd resin. The mixture was manually stirred for ca. 1 minute and stored in a closed vessel overnight at room temperature. The Mn level was 0.01 wt % with respect to the resin solution (0.014 wt % with respect to the solid resin). The resin solution was applied on a glass plate with a layer thickness of 37 μm. The drying process was followed using a drying recorder. No drying was observed within 12 h.

Comparative Experiment 12 [Fe(N$_2$Py$_2$)Cl$_2$] (3)

Experiment 11 was repeated, except that now 3.04 mg of (3) dissolved in 50 μL water was used (yielding a Fe level of 0.014 wt-% with respect to resin). A surface dry time of 3.75 h was obtained. No through dry within 10 h.

The results presented above show the following:
1. A good alkyd drying activity is obtained when TPA was pre-mixed with Mn(2-ethylhexanoate)$_2$, Mn(acetate)$_2$, and Mn(chloride)$_2$, respectively (Experiments 1a-1c). Therefore, the specific counterion of the manganese salt does not influence the drying behavior towards alkyd resin to a significant extent. Under the same conditions Mn(2-ethylhexanoate)$_2$ without ligand added did not show drying within 12 h (Comparative Experiment 8).
2. Employing the same level of the standard siccative Co(2-ethylhexanoate)$_2$ as used for the tests with Mn-TPA mixtures (0.014 wt-% metal with respect to the alkyd resin), led to a much worse paint drying activity for the Co(2-ethylhexanoate)$_2$ as compared to the Mn-TPA mixtures (Experiments 1a-1c vs Comparative Experiment 10).
3. Lowering the level of Mn soap (and TPA) to a level of 0.007 wt-% with respect to the alkyd resin, led still to a good drying behavior, indicating that the paint formulator has flexibility in choosing the optimal level of Mn salt and TPA ligand (Experiment 1d).
4. Doubling the level of TPA whilst keeping the manganese level constant at 0.007 wt % led to a clear reduction of surface drying time (Experiment 1e vs 1d).
5. Premixing TPA ligand into the alkyd resin with the addition of Mn(2-ethylhexanoate)$_2$ the next day led to the same drying time as when first premixing Mn(2-ethylhexanoate)$_2$ with TPA and adding this mixture to the alkyd resin (Experiment if vs 1a).
6. Fe(2-ethylhexanoate)$_2$, iron(II) chloride and iron(II) sulfate premixed with TPA at 0.014 wt-% level also showed an improved drying with respect to cobalt (2-ethylhexanoate)$_2$ at the same level (Experiments 2a-2c vs Comparative Experiment 10). Under the same conditions Fe(2-ethylhexanoate)$_2$ without ligand added did not show drying within 10 h (Comparative Experiment 9).
7. Premixing the TPA ligand to the resin, with the addition of iron (2-ethylhexanoate)$_2$ the next day led to an accelerated drying compared to cobalt (2-ethylhexanoate)$_2$.
8. Use of the well-defined dinuclear MnTPA complex (1) yielded a slightly lower activity as when using the manganese salt/TPA mixture (Experiment 3a vs Experiment 1a-1c), but is still much faster than Mn(ethylhexanoate)$_2$ or Co(ethylhexanoate)$_2$ (Comparative experiments 8 and 10 respectively).
9. A good alkyd drying activity is obtained when CH$_3$N$_3$py was premised with Mn(2-ethylhexanoate)$_2$, Mn(acetate)$_2$, and Mn(chloride)$_2$, respectively (Experiments 4a-4c), and in fact similar to those found for the analogous experiments with TPA (Experiments 1a-1c). Also the experiment carrying out first premixing the $CH_3N_3py$ ligand to the resin and then after one day adding the manganese soap resulted in a good drying behavior as seen for the TPA analog (Experiment 4d vs if). These results further support the use of chelants of formulae (I) and (II) that are capable of chelating one transition metal ion through four nitrogen atoms for activating manganese ions so as to dry alkyd resins efficiently.
10. The iron salts with $CH_3N_3py$ also show an improved drying behavior as compared to $Fe(napht)_2$ and $Co(2$-ethylhexanoate$)_2$ (Experiments 5a-5c vs Comparative Experiments 9 and 10).
11. Premixing $CH_3N_3py$ ligand with the resin, led, after subsequent addition a good drying as compared to the premix experiments of Fe soap and $CH_3N_3py$ ligand (Experiment 5e vs 5a).
12. Mixing $Mn(2$-ethylhexanoate$)_2$ with TPM led also to excellent paint drying (Experiment 6).
13. Comparing the paint drying results of Mn-salts with the tetradentate TPA and $CH_3N_3py$ ligands with those of a manganese so-called bispidon complex (2), which is described in WO 2008/003652 A1 (Unilever PLC et al.), shows that the alkyd drying activity for the TPA and $CH_3N_3py$ manganese complexes/mixtures is surprisingly good (Experiments 1a-1f vs Comparative Experiment 11). Similar conclusions have been made for the iron analogs (Experiments 2a-2d vs Comparative Experiment 12). These results are even more surprising as one of the preferred iron complexes described in WO 2008/003652 A1, with a pentadentate bispidon ligand (2,4-di-(2-pyridyl)-3-methyl-7-(pyridin-2-ylmethyl)-3,7-diaza-bicyclo[3.3.1]nonan-9-one-1,5-dicarboxylate) shows a very good siccative activity, whilst the analogous iron complex with the tetradentate bispidon ligand (compound 3 herein, having a 7-methyl group in place of the 7-(pyridin-2-ylmethyl group in the pentadentate bispidon ligand) does not show any appreciable siccative activity. Therefore, knowing that another preferred siccative disclosed in WO 2008/003652 A1, the iron complex of N,N-bis(pyridin-2-yl-methyl)-1,1-bis(pyridin-2-yl)-1-aminoethane (MeN4py) (from the class II as described in that publication), is also very active as siccative, one would have expected to find a similar trend as found for the bispidon compounds: removing one pyridine group from the pentadentate $N_4py$ ligand would lead to a poor drying activity. It is very surprising indeed that both TPA and $CH_3N_3py$ with Fe (and Mn) exhibit such good paint drying activity. Also surprising is that, whilst the results shown in WO 2008/003652 A1 indicated that the iron complexes of the bispidon and $N_4py$ ligands are of most interest as siccatives, the results presented herein clearly indicate that the manganese complexes with TPA, $CH_3N_3py$ and TPM are even more active than the corresponding iron complexes.

The invention claimed is:
1. A formulation comprising an oxidatively curable alkyd-based curable resin and a chelant, which is of formulae (I) or (I-B):

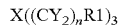 (I) or

 (I-B)

wherein:
the or each X is N or CZ, wherein Z is selected from hydrogen, optionally $C_{1-6}$alkyl-substituted $C_{1-24}$alkyl, optionally $C_{1-6}$alkyl-substituted $C_{1-24}$alkyl-oxy-$C_{1-24}$alkyl, optionally $C_{1-6}$alkyl-substituted $C_{1-24}$alkyl-oxy-$C_{6-10}$aryl, optionally $C_{1-6}$alkyl-substituted $C_{1-24}$alkyl-O—$C_{6-10}$aryl$C_{1-24}$alkyl, optionally $C_{1-6}$alkyl-substituted hydroxy$C_{1-24}$alkyl, optionally $C_{1-6}$alkyl-substituted $C_{6-10}$aryl and optionally $C_{1-6}$alkyl-substituted $C_{6-10}$aryl$C_{1-24}$alkyl;
n is 0 if X=CZ and 1 if X=N;
each Y is independently selected from H, $CH_3$, $C_2H_5$ and $C_3H_7$;
each —R1 is independently selected from —$CY_2N(C_{1-24}$alkyl$)_2$; —$CY_2NR3$, in which R3 and the nitrogen atom N to which it is attached represent a heterocycloalkyl group optionally substituted with one or more $C_{1-6}$alkyl groups, which is connected to the adjacent $CY_2$ moiety through the nitrogen atom N; or represents an optionally $C_{1-6}$alkyl-substituted heteroaryl group selected from pyridin-2-yl, pyrazin-2-yl, quinolin-2-yl, pyrazol-1-yl, pyrazol-3-yl, pyrrol-2-yl, imidazol-2-yl, imidazol-4-yl, benzimidazol-2-yl, pyrimidin-2-yl, 1,2,3-triazol-1-yl, 1,2,3-triazol-2-yl, 1,2,3-triazol-4-yl, 1,2,4-triazol-1-yl, 1,2,4-triazol-3-yl and thiazol-2-yl;
both —R2— moieties, if present, are independently selected from an optionally $C_{1-6}$alkyl-substituted heteroarylene group selected from pyridin-2,6-diyl, pyrazin-2,6-diyl, quinolin-2,8-diyl, pyrazol-1,3-diyl, pyrrol-2,5-diyl, imidazol-1,4-diyl, imidazol-2,5-diyl, pyrimidin-2,6-diyl, 1,2,3-triazol-2,5-diyl, 1,2,4-triazol-1,3-diyl, 1,2,4-triazol-3,5-diyl and thiazol-2,4-diyl;
Q represents a bridge selected from the group consisting of a $C_{1-6}$alkylene moiety, a $C_{6-10}$arylene moiety or a moiety comprising one or two $C_{1-3}$alkylene units and one $C_{6-10}$arylene unit, which bridge is optionally substituted one or more times with independently selected $C_{1-24}$alkyl groups and OH groups;
or is of formulae (II), (II-B) or (II-C):

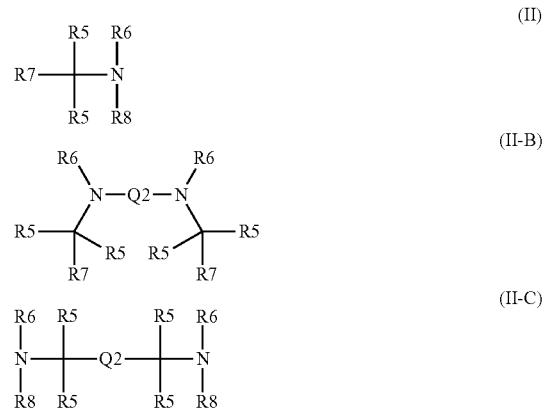

wherein:
each —R5 independently is selected from —$CH_2N(C_{1-24}$alkyl$)_2$, —$CH_2NR9$ or an optionally $C_{1-6}$alkyl-substituted heteroaryl group selected from pyridin-2-yl, pyrazin-2-yl, quinolin-2-yl, pyrazol-1-yl, pyrazol-3-yl, pyrrol-2-yl, imidazol-2-yl, imidazol-4-yl, benzimidazol-2-yl, pyrimidin-2-yl, 1,2,3-triazol-1-yl, 1,2,3-triazol-2-yl, 1,2,3-triazol-4-yl, 1,2,4-triazol-1-yl, 1,2,4-triazol-3-yl and thiazol-2-yl);
the or each —R6 independently represents —R10-R11;
the or each —R7 and the or each —R8 each independently represents hydrogen, or a group selected from $C_{1-18}$alkyl, $C_{6-10}$aryl, $C_{5-10}$heteroaryl, $C_{6-10}$aryl$C_{1-6}$alkyl and $C_{5-10}$heteroaryl$C_{1-6}$alkyl, each of which groups may be optionally $C_{1-6}$alkyl-substituted, with the proviso that no —R7 or —R8 may be one of the possibilities permitted for —R5;

the or each —R10- independently represents optionally $C_{1-6}$alkyl-substituted $C_{1-6}$alkylene;

the or each —R11 independently represents hydrogen, $C_{1-6}$alkyl, optionally $C_{1-6}$alkyl-substituted $C_{6-10}$aryl, optionally $C_{1-6}$alkyl-substituted $C_{5-10}$heteroaryl, optionally $C_{1-6}$alkyl-substituted $C_{5-10}$heteroaryl $C_{1-6}$alkyl, $CY_2N(C_{1-24}$alkyl$)_2$ group or $CY_2NR9$;

each —NR9 independently represents a moiety in which R9 and the nitrogen atom N to which it is attached represent a heterocycloalkyl group optionally substituted with one or more $C_{1-20}$alkyl groups, which is connected to the remainder of the chelant through the nitrogen atom N; and Q2 represents a bridge selected from the group consisting of a $C_{1-6}$alkylene moiety $C_{6-10}$arylene moiety or a moiety comprising one or two $C_{1-3}$alkylene units and one $C_{6-10}$arylene unit, which bridge is optionally substituted one or more times with independently selected $C_{1-24}$alkyl groups and OH groups, the formulation comprising a complex comprising the chelant and a Mn transition metal ion, wherein the complex is not well-defined.

2. The formulation of claim 1, wherein:

the or each X is N or CZ wherein Z is selected from H, methyl, hydroxymethyl, methoxymethyl and benzyl;

each Y, if present, is H;

each —R1 is pyridin-2-yl, imidazol-2-yl, imidazol-4-yl, benzimidazol-2-yl, each of which is optionally substituted with one or more $C_{1-6}$alkyl groups;

both —R2- moieties, if present, are pyridin-2,6-diyl, imidazol-1,4-diyl or imidazol-2,5-diyl;

each R5 is optionally substituted pyridin-2-yl;

the or each —R7 is selected from —H, methyl and benzyl;

the or each —R8 is selected from —H, $C_{1-18}$alkyl and benzyl;

the or each —R10- is —$CH_2$—;

the or each R11 is optionally substituted pyridin-2-yl, imidazol-2-yl, imidazol-4-yl or benzimidazol-2-yl; and each Q and Q2, if present, is selected from —$CH_2CH_2$—, —$CH_2CH_2CH_2$—, —$CH_2CHOHCH_2$—, 1,2-phenylene and 1,4-phenylene, each of which is optionally $C_{1-6}$alkyl-substituted.

3. The formulation of claim 1, wherein the chelant is N,N,N-tris(pyridine-2-yl-methylamine, tris(pyridine-2-yl)methane, N-methyl-N-(pyridin-2-yl-methyl)-bis(pyridin-2-yl)methylamine, N-benzyl-N-(pyridin-2-yl-methyl)-bis(pyridin-2-yl)methylamine, N,N-dimethyl-bis(pyridin-2-yl)methylamine, N-methyl-N-(pyridin-2-yl-methyl-1,1-bis(pyridin-2-yl)-1-aminoethane, N-benzyl-N-(pyridin-2-yl-methyl-1,1-bis(pyridin-2-yl)-1-aminoethane, N-methyl-N-(pyridin-2-yl-methyl-1,1-bis(pyridin-2-yl)-2-phenyl-1-aminoethane or N-benzyl-N-(pyridin-2-yl-methyl-1,1-bis(pyridin-2-yl)-2-phenyl-1-aminoethane.

4. A method of preparing the formulation as defined in claim 1, the method comprising contacting a composition comprising the alkyd-based resin with a composition comprising the chelant.

5. The method of claim 4, wherein the method comprises preparing the formulation comprising less than 0.001% by weight manganese.

6. A composition resultant from curing of the formulation as defined in claim 1.

7. A method comprising apply to a substrate the formulation as defined in claim 1.

8. The formulation of claim 2, wherein the or each R11 is unsubstituted pyridine-2-yl; and each Q and Q2, if present is —$CH_2CH_2$—.

9. The formulation of claim 1, wherein the chelant is N,N,N-tris(pyridine-2-yl-methyl)amine, tris(pyridine-2-yl)methane, N-methyl-N-(pyridine-2-yl-methyl-bis(pyridine-2-yl)methylamine or N-benzyl-N-(pyridine-2-yl-methyl)-bis(pyridine-2-yl)methylamine.

10. The method of claim 5, wherein the composition comprising the chelant comprises a complex comprising the chelant and a Mn transition metal.

11. The method of claim 10, wherein the composition comprising the complex comprises a mixture of the chelant and a salt of the Mn transition metal.

12. The method of claim 11, wherein the salt is an optionally hydrated salt selected from the group consisting of $MnCl_2$, $MnBr_2$, $Mn(NO_3)_2$, $MnSO_4$, Mn(acetylacetonate)$_2$, Mn(acetylacetonate)$_3$, Mn($R_4COO$)$_3$, and Mn($R_4COO$)$_2$ and wherein each $R_4$ is a $C_1$-$C_{24}$ alkyl.

13. A formulation obtained by a method as defined in claim 11.

* * * * *